US010356281B2

(12) United States Patent
Yamashita et al.

(10) Patent No.: US 10,356,281 B2
(45) Date of Patent: Jul. 16, 2019

(54) PROFILE ADJUSTMENT METHOD, STORAGE MEDIUM STORING PROFILE ADJUSTMENT PROGRAM, AND PROFILE ADJUSTMENT APPARATUS

(71) Applicant: SEIKO EPSON CORPORATION, Tokyo (JP)

(72) Inventors: Mitsuhiro Yamashita, Nagano (JP); Kenji Fukasawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/174,363

(22) Filed: Oct. 30, 2018

(65) Prior Publication Data
US 2019/0132488 A1 May 2, 2019

(30) Foreign Application Priority Data
Nov. 1, 2017 (JP) .................................. 2017-211807

(51) Int. Cl.
*H04N 1/60* (2006.01)
(52) U.S. Cl.
CPC ......... *H04N 1/6008* (2013.01); *H04N 1/6011* (2013.01); *H04N 1/6019* (2013.01); *H04N 1/6052* (2013.01); *H04N 1/6075* (2013.01)
(58) Field of Classification Search
CPC ........................... H04N 1/6008; H04N 1/6011
See application file for complete search history.

(56) References Cited

U.S. PATENT DOCUMENTS

| 5,815,642 | A | | 9/1998 | Kumada |
| 5,844,542 | A | * | 12/1998 | Inoue .................... G09G 1/285 345/594 |
| 7,382,379 | B1 | | 6/2008 | Edge et al. |
| 2003/0053097 | A1 | * | 3/2003 | Ohga ................... H04N 1/6011 358/1.9 |

(Continued)

FOREIGN PATENT DOCUMENTS

| JP | 07-254995 A | 10/1995 |
| JP | 2003-087589 A | 3/2003 |

(Continued)

OTHER PUBLICATIONS

The Extended European Search Report for the corresponding European Patent Application No. 18203948.7 dated Mar. 28, 2019.

*Primary Examiner* — Ibrahim Siddo

(57) ABSTRACT

In an output profile representing a correspondence relationship between device independent coordinate values and second coordinate values in a second device dependent color space, a color conversion table used to convert the device independent coordinate values into the second coordinate values is defined as a first conversion table, and the device independent coordinate values at the adjustment point are defined as to-be-adjusted PCS values. In optimization, an optimization process including an element making provisional color values closer to an adjustment target is executed, the provisional color value being acquired by a conversion, in accordance with the first conversion table, of provisional PCS values resulting from a change in the to-be-adjusted PCS values, thus acquiring an optimal solution for the device independent coordinate values corresponding to the adjustment target.

20 Claims, 15 Drawing Sheets

(56) References Cited

U.S. PATENT DOCUMENTS

| | | | |
|---|---|---|---|
| 2005/0206926 A1* | 9/2005 | Tsuji | H04N 1/6008 358/1.9 |
| 2008/0158579 A1 | 7/2008 | Ohga et al. | |
| 2010/0328691 A1 | 12/2010 | Hoshino et al. | |
| 2016/0234402 A1 | 8/2016 | Yamaguchi | |

FOREIGN PATENT DOCUMENTS

| | | |
|---|---|---|
| JP | 2011-010231 A | 1/2011 |
| JP | 2018-207327 A | 12/2018 |
| JP | 2018-207328 A | 12/2018 |

\* cited by examiner

PROFILE ADJUSTMENT METHOD, STORAGE MEDIUM STORING PROFILE ADJUSTMENT PROGRAM, AND PROFILE ADJUSTMENT APPARATUS

BACKGROUND

1. Technical Field

The invention relates to a technique for adjusting a profile representing a correspondence relationship between coordinate values in a device dependent color space and coordinate values in a profile connection space.

2. Related Art

In a case of using an ink jet-type printer for calibration applications for printing such as offset printing, a demanded color reproduction accuracy (the degree to which colors are accurately reproduced) is very high. One mechanism for achieving such an accuracy is a color management system using an International Color Consortium (ICC) profile. The ICC profile is data representing a correspondence relationship between device independent colors and device dependent colors provided by color devices such as a printing machine (for example, an offset printing machine) and an ink jet-type printer. The device dependent colors provided by a printing machine and an ink jet-type printer are represented by coordinate values in a device dependent color space, for example, by CMYK values indicating the use amounts of cyan (C), magenta (M), yellow (Y), and black (K). The device independent colors are represented, for example, by hue values in a Commission Internationale de l'Eclairage (CIE, the International Commission on Illumination) L*a*b* color space (hereinafter "*" is omitted and the L*a*b* value is referred to as the Lab value) or by hue values in a CIE XYZ color space, the color spaces being device independent color spaces.

Here, it is assumed that the ICC profile for a printing machine is used as an input profile, and the ICC profile for an ink jet-type printer is used as an output profile. When CMYK values for the printing machine are converted into hue values (e.g., Lab values) in a Profile Connection Space (PCS) in accordance with the input profile, the hue values can be converted into CMYK values for the ink jet-type printer (hereinafter referred to as $CMYK_p$ values) in accordance with the output profile. When printing is performed using the ink jet-type printer in accordance with the $CMYK_p$ values, colors similar to the colors provided by the printing machine can be reproduced by the ink jet-type printer. In actuality, expected colors may fail to be reproduced due to an error in the profile, a color measurement error, a fluctuation in the printer, and the like. In such a case, spot color adjustment is performed by specifying an adjustment point representing a spot color to be adjusted, specifying an adjustment target for the adjustment point, and modifying the ICC profile, based on the adjustment target.

JP-A-2003-87589 discloses that B2A data of an output profile for a CMYK printer is applied to a first Lab value and that A2B data of the output profile for a CMYK printer is further applied to the resultant first Lab value to acquire a second Lab value, and a color difference between the second Lab value and the first Lab value is obtained. The second Lab value is a simulation result for the hue value of a color printed out by the CMYK printer using an output profile for a calibrator as a source profile and using the output profile for the CMYK printer as a destination profile.

SUMMARY

To supply feedback of the adjustment target to the input profile, an Lab value corresponding to the $CMYK_p$ value for the ink jet-type printer may be used. Here, when an A2B table of the output profile is used to convert the $CMYK_p$ value into the Lab value, an error in an A2B table causes a difference between the Lab value and an actual target Lab value. Thus, even when the input profile is adjusted, the expected color may fail to be acquired, or much time and effort may be unavoidable for the adjustment.

The above-described problem is not limited to the case of adjustment of the input profile intended for ink jet-type printers but also occurs in the case of adjustment of profiles intended for various color devices.

An advantage of some aspects of the invention is to provide a technique capable of improving the color reproduction accuracy of a profile representing a correspondence relationship between coordinate values in a device dependent color space and coordinate values in a profile connection space.

To achieve the advantage, an aspect of the invention provides a profile adjustment method for causing a computer to execute a process for adjusting a to-be-adjusted profile representing a correspondence relationship between first coordinate values in a first device dependent color space and device independent coordinate values in a profile connection space, the profile adjustment method including acquiring, for an adjustment point corresponding to a to-be-adjusted color, an adjustment target based on coordinates in a second device dependent color space, defining, as a first conversion table, a color conversion table used to convert the device independent coordinate values into second coordinate values in the second device dependent color space, in an output profile representing a correspondence relationship between the device independent coordinate values and the second coordinate values, defining the device independent coordinate value at the adjustment point as to-be-adjusted PCS values, and executing an optimization process including an element making provisional color values closer to the adjustment target, the provisional color value being acquired by a conversion, in accordance with the first conversion table, of provisional PCS values resulting from a change in the to-be-adjusted PCS values, thus acquiring an optimal solution for the device independent coordinate values corresponding to the adjustment target, and adjusting the to-be-adjusted profile, based on the optimal solution for the device independent coordinate values.

Furthermore, another aspect of the invention provides a profile adjustment program causing a computer to implement functions corresponding to the steps of the above-described profile adjustment method.

Moreover, yet another aspect of the invention provides a profile adjustment device including units corresponding to the steps of the above-described profile adjustment method.

Moreover, still another aspect of the invention provides a profile adjustment system including units corresponding to the steps of the above-described profile adjustment method.

The above-described aspects can provide a technique capable of improving the color reproduction accuracy of the profile representing the correspondence relationship between the coordinate values in the device dependent color space and the coordinate values in the profile connection space.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
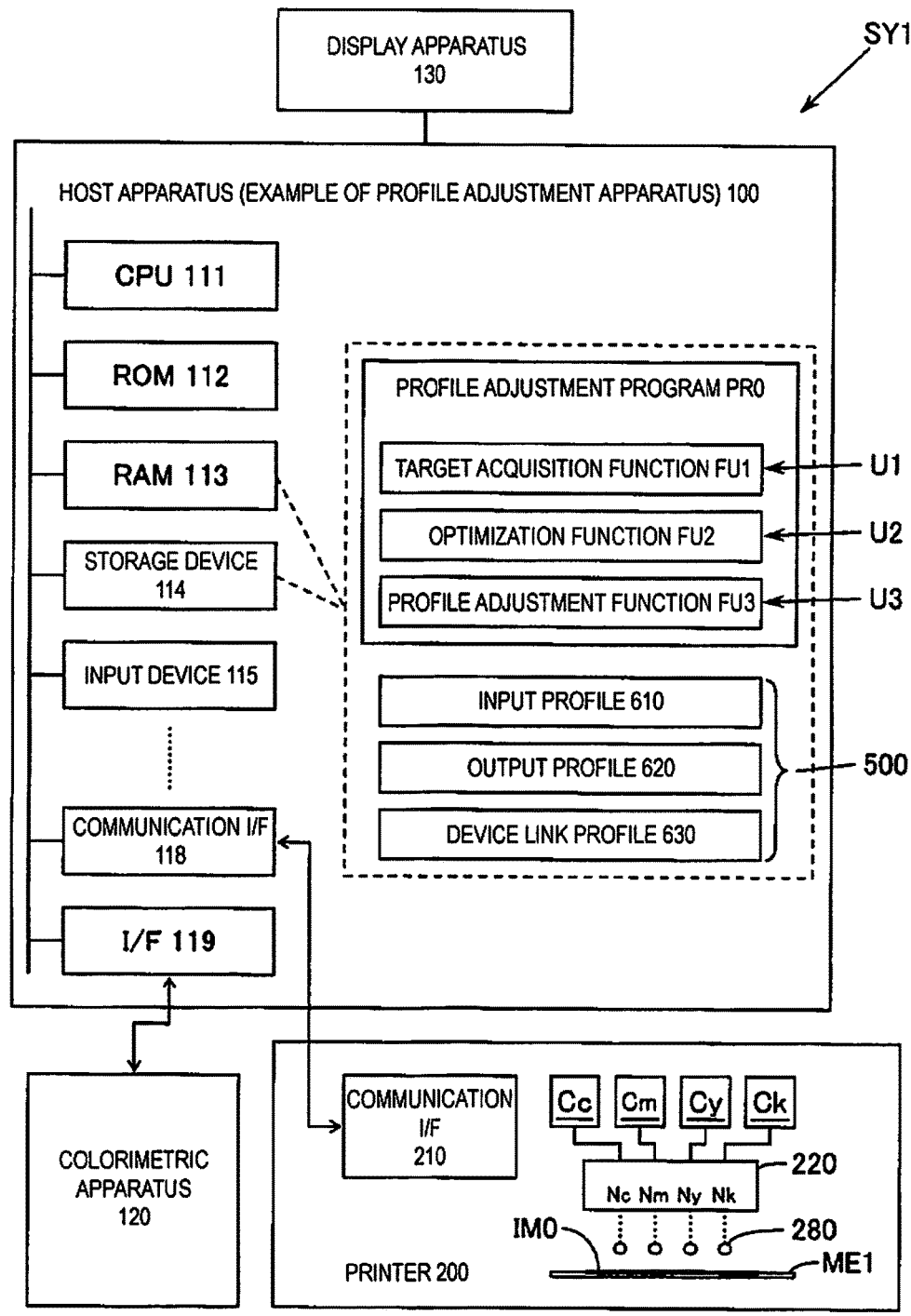
FIG. 1 is a block diagram schematically illustrating a configuration example of a profile adjustment system.

Exemplary embodiments of the invention will be described. Of course, the following exemplary embodiments only illustrate the invention, and not all features illustrated in the exemplary embodiments are indispensable for the solution of the invention.

1. OVERVIEW OF TECHNIQUE INCLUDED IN INVENTION

First, an overview of the technique included in the invention will be described with reference to examples illustrated in FIGS. 1 to 15B. Note that the drawings of the present application schematically illustrate the examples, that an enlargement factor in each direction illustrated in each drawing may vary among the drawings, and that the drawings may not be consistent with one another. Of course, the elements of the technique are not limited to specific examples illustrated with reference numerals.

Aspect 1

As illustrated in FIG. 2, FIGS. 6 to 13, and the like, a profile adjustment method according to Aspect 1 of the technique causes a computer (e.g., a host apparatus 100) to execute a process for adjusting a to-be-adjusted profile (e.g., an input profile 610) representing a correspondence relationship between first coordinate values (e.g., CMYK values) in a first device dependent color space CS1 (e.g., a CMYK color space) and device independent coordinate values (e.g., Lab values) in a profile connection space CS3 (e.g., an Lab color space). The profile adjustment method includes a target acquisition step ST1, an optimization step ST2, and a profile adjustment step ST3. In the target acquisition step ST1, for an adjustment point P0 corresponding to a to-be-adjusted color, an adjustment target T0 (e.g., $cmyk_T$) based on coordinates in a second device dependent color space CS2 (e.g., a cmyk color space) is acquired. Here, in an output profile 620 representing a correspondence relationship between the device independent coordinate values (Lab values) and second coordinate values (e.g., cmyk values) in the second device dependent color space CS2, a color conversion table used to convert the device independent coordinate values (Lab values) into the second coordinate values (cmyk values) is defined as a first conversion table (e.g., a B2A table 621). Furthermore, the device independent coordinate values (Lab values) at the adjustment point P0 are defined as to-be-adjusted PCS values (e.g., $Lab_{S1}$). In the optimization step ST2, the optimization process is executed that includes an element making provisional color values (e.g., $cmyk_{pp}$) closer to the adjustment target T0, the provisional color values being acquired by a conversion, in accordance with the first conversion table (621), of provisional PCS values (e.g., $Lab_{pS1}$) resulting from a change in the to-be-adjusted PCS values ($Lab_{S1}$), thus acquiring an optimal solution (e.g., $Lab_b$) for the device independent coordinate values (Lab values) corresponding to the adjustment target T0. In the profile adjustment step ST3, the to-be-adjusted profile (610) is adjusted based on the optimal solution ($Lab_b$) for the device independent coordinate values (Lab values).

In Aspect 1, the to-be-adjusted profile (610) is adjusted based on the optimal solution ($Lab_b$) for the device independent coordinate values (Lab values) resulting from the optimization process including the element making the provisional color values ($cmyk_{pp}$) closer to the adjustment target T0 ($cmyk_T$). The optimal solution $Lab_b$ includes no error from an A2B table 622 of the output profile 620, and thus, when a color conversion is performed in accordance with the to-be-adjusted profile (610) and the output profile 620, an output color from a second device (e.g., a printer 200) is close to an intended color.

Therefore, Aspect 1 can provide a profile adjustment method improving the color reproduction accuracy of the profile representing the correspondence relationship between the coordinate values in the device dependent color space and the coordinate values in the profile connection space.

Here, examples of the profile connection space include color spaces such as a CIE Lab color space and a CIE XYZ color space.

Examples of the first device dependent color space include a CMYK color space, a CMY color space, and an RGB color space. Note that R means red, G means green, and B means blue.

Examples of the second device dependent color space include a CMYK color space, a CMY color space, and an RGB color space. In the exemplary embodiments described below, to be distinguished from the CMYK color space of the first device dependent color space in a case where the second device dependent color space is the CMYK color space, the second device dependent color space is represented as a cmyk color space.

The adjustment target based on the coordinates in the second device dependent color space may be represented by coordinate values in the second device dependent color space or by a difference from the current coordinate values in the second device dependent color space.

As the optimization process, an optimization process based on a quasi-Newton method, an optimization process based on a Newton method, an optimization process based on a conjugate gradient method, or the like may be used.

Examples of acquisition of the optimal solution by the optimization process includes determining the optimal solution from a plurality of solutions acquired by a plurality of optimization processes and acquiring the optimal solution, based on a single optimization process.

The additional description of Aspect 1 also applies to the following aspects.

Aspect 2

Figure 8:
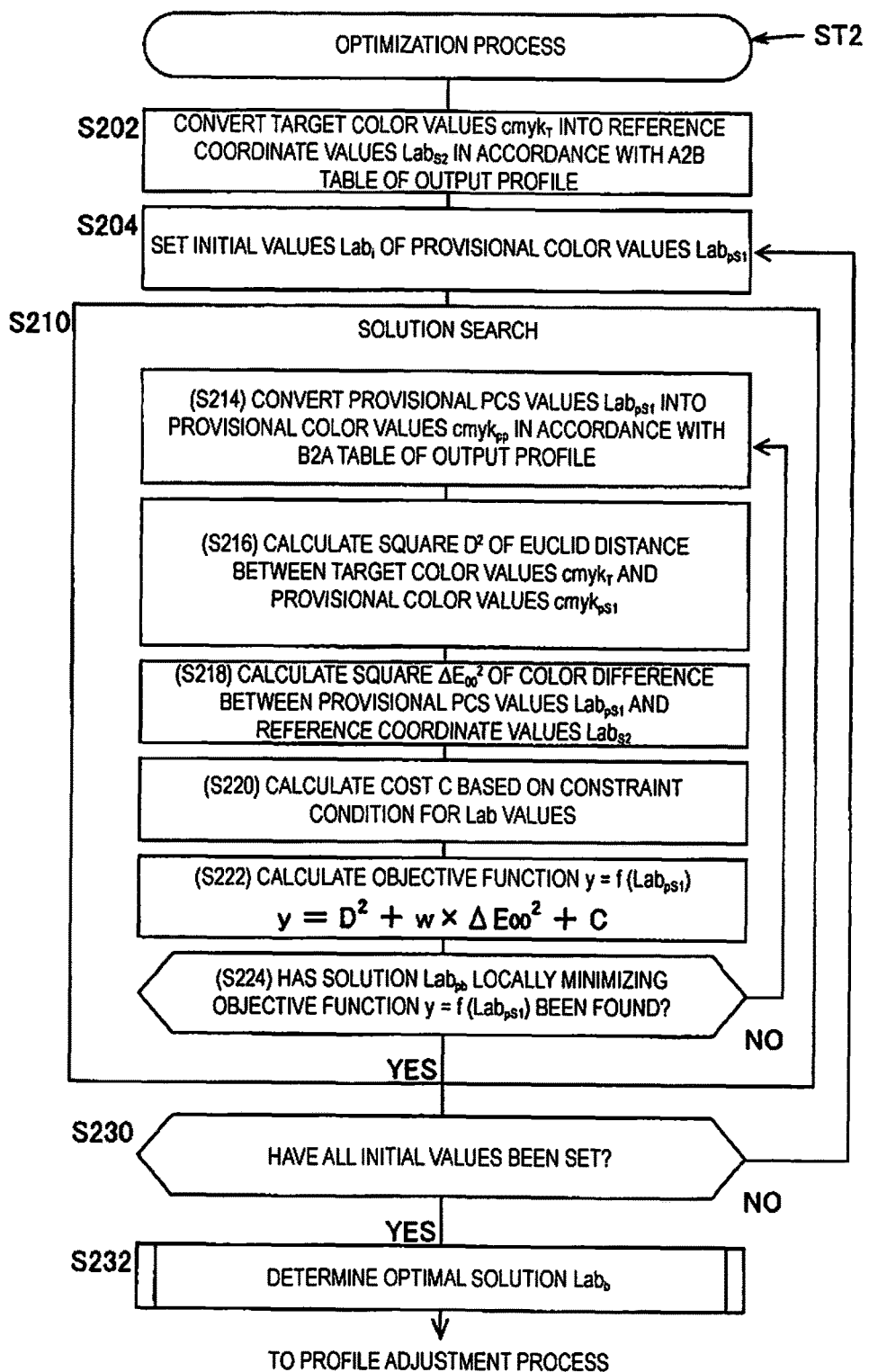
FIG. 8 is a flowchart illustrating an example of an optimization process.

The second coordinate values (cmyk values) representing the adjustment target T0 are defined as target color values (e.g., $cmyk_T$). As illustrated in FIG. 8, in the optimization step ST2, the optimal solution ($Lab_b$) may be acquired by the optimization process using an objective function (e.g., y=f ($Lab_{pS1}$)) including the square (e.g., $Dc^2$, $Dm^2$, $Dy^2$, $Dk^2$) of differences (e.g., Dc, Dm, Dy, Dk) between the provisional color values ($cmyk_{pp}$) and the target color values ($cmyk_T$) for respective element color (e.g., cmyk) in the second device dependent color space CS2. Note that, in a case where output values from the objective function decrease consistently with the squares of the differences, the element making the provisional color values ($cmyk_{pp}$) closer to the target color values ($cmyk_T$) is a reduction of the output values from the objective function. Aspect 2 eliminates the need for calculation of a square root, enabling an increase in the speed of the optimization process.

Note that the calculation of a square root is not included in Aspect 2 but is also included in the technique.

Aspect 3

Here, in the output profile 620, a color conversion table used to convert the second coordinate values (cmyk values) into the device independent coordinate values (Lab values) is defined as a second conversion table (e.g., the A2B table 622). As illustrated in FIG. 8, in the optimization step ST2, the optimal solution ($Lab_b$) may be acquired by the optimization process using an objective function (e.g., y=f ($Lab_{pS1}$)) including differences (Dc, Dm, Dy, Dk) between the provisional color values ($cmyk_{pp}$) and the target color values ($cmyk_T$) for respective element colors (cmyk) in the second device dependent color space CS2, the objective function including, besides the differences (Dc, Dm, Dy, Dk), a color difference (e.g., $\Delta E_{00}$) between the provisional PCS values ($Lab_{pS1}$) and the device independent coordinate values (e.g., $Lab_{S2}$) resulting from a conversion of the target color values ($cmyk_T$) in accordance with the second conversion table (622). The objective function (y=f ($Lab_{pS1}$)) includes, besides the differences (Dc, Dm, Dy, Dk) between the provisional color values ($cmyk_{pp}$) and the target color values ($cmyk_T$), the color difference ($\Delta E_{00}$) between the provisional PCS values ($Lab_{pS1}$) and the second conversion table converted values ($Lab_{S2}$), and thus the optimal solution $Lab_b$ is restrained from deviating significantly from the device independent coordinate values $Lab_{S2}$ predicted to be close to the target color value. Thus, Aspect 3 can provide a technique further improving the color reproduction accuracy of the to-be-adjusted profile.

Note that a case where the objective function does not include the color differences between the provisional PCS values and the second conversion table converted values is not included in Aspect 3 but is also included in the technique.

Aspect 4

As illustrated in FIG. 8, in the optimization step ST2, the optimal solution ($Lab_b$) may be acquired by the optimization process by applying possible ranges (e.g., 0 to 100 for L and −128 to 127 for a, b) of the device independent coordinate values (Lab value) as a constraint condition for the ranges of the provisional PCS values ($Lab_{pS1}$). Adjusting the provisional PCS values ($Lab_{pS1}$) such that the provisional PCS values ($Lab_{pS1}$) exceeds the possible ranges of the device independent coordinate values (Lab values) is precluded, and thus, Aspect 4 can provide a suitable optimization process.

Here, in the present application, "Min to Max" means the minimum value Min or greater and the maximum value Max or smaller.

Note that a case without the constraint condition is not included in Aspect 4 but is also included in the technique.

Aspect 5

Figure 9:
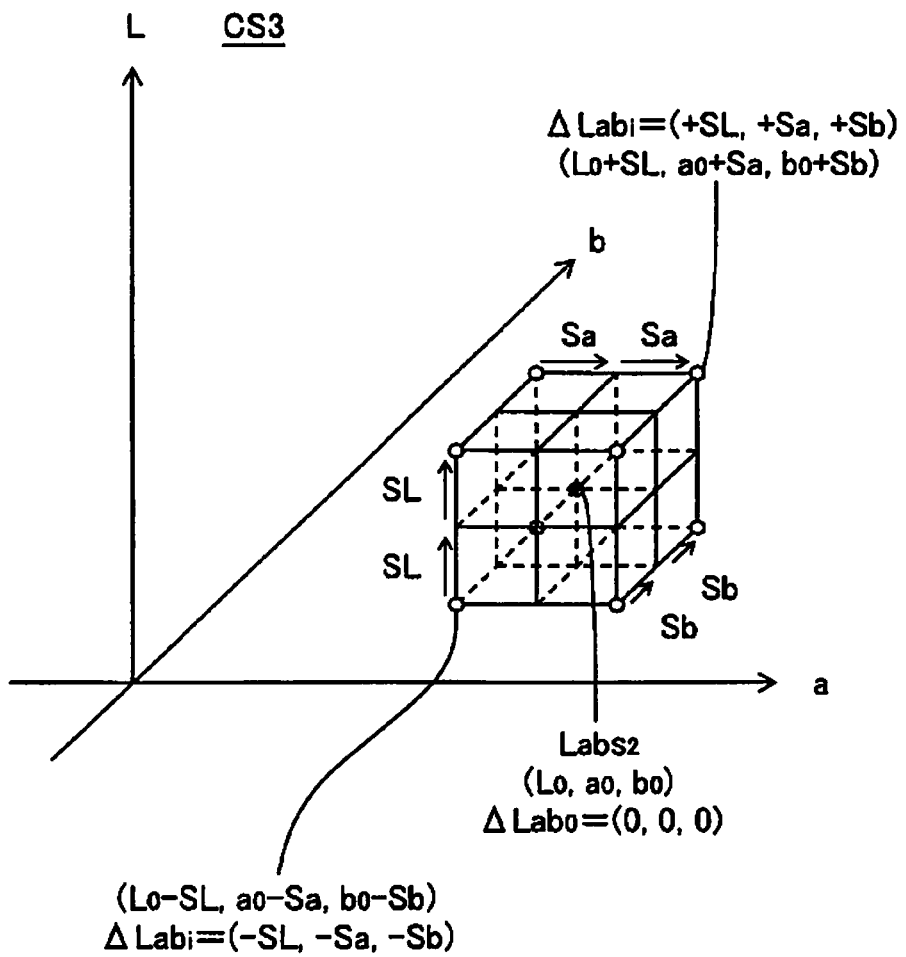
FIG. 9 is a diagram schematically illustrating an example where an initial value of a provisional PCS value is changed.

As illustrated in FIG. 8 and FIG. 9, in the optimization step ST2, the device independent coordinate values ($Lab_{S2}$) resulting from a conversion of the target color values ($cmyk_T$) in accordance with the second conversion table (622) may be used for the optimization process as initial values (e.g., $Lab_0$) of the provisional PCS values ($Lab_{pS1}$). Even with an error in the second conversion table (622), the device independent coordinate values ($Lab_{S2}$) are values close to the optimal solution ($Lab_b$). Therefore, Aspect 5 can provide a suitable optimization process.

Note that a case where the device independent coordinate values ($Lab_{S2}$) are not the initial values of the provisional color values is not included in Aspect 5 but is also included in the technique.

Aspect 6

As illustrated in FIG. 8 and FIG. 9, in the optimization step ST2, a plurality of the initial values (e.g., $Lab_i$) of the provisional PCS values ($Lab_{pS1}$) may be used for the optimization process. In the optimization step ST2, a plurality of candidates for the optimal solution (e.g., $Lab_{pb}$) for the device independent coordinate values (Lab values) may be acquired by executing, on each of the plurality of initial values ($Lab_i$), the optimization process using the objective function (y=f ($Lab_{pS1}$)). In the optimization step ST2, the optimal solution ($Lab_b$) may be acquired based on the plurality of candidates for the optimal solution ($Lab_{pb}$). The objective function (y=f ($Lab_{pS1}$)) may have a plurality of local minimum values or a plurality of local maximum values. However, a more preferable solution can be acquired using a plurality of initial values ($Lab_i$) of the provisional PCS values ($Lab_{pS1}$). Hence, Aspect 6 can provide a suitable optimization process.

Note that a case where the provisional PCS color values have a single pattern of initial values is not included in Aspect 6 but is also included in the technique.

Aspect 7

Figure 10:
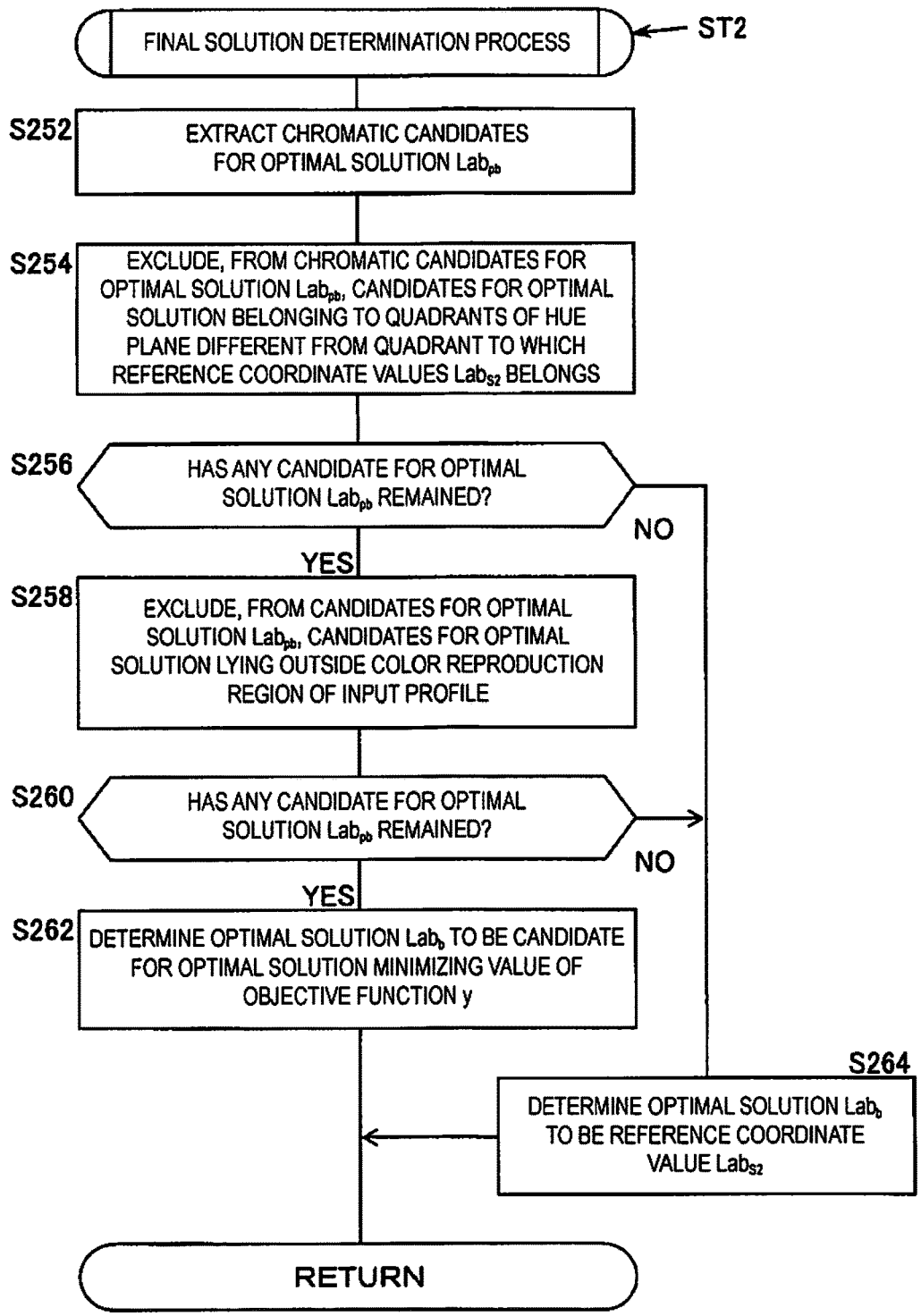
FIG. 10 is a flowchart illustrating an example of an optimal-solution determination process.
Figure 11:
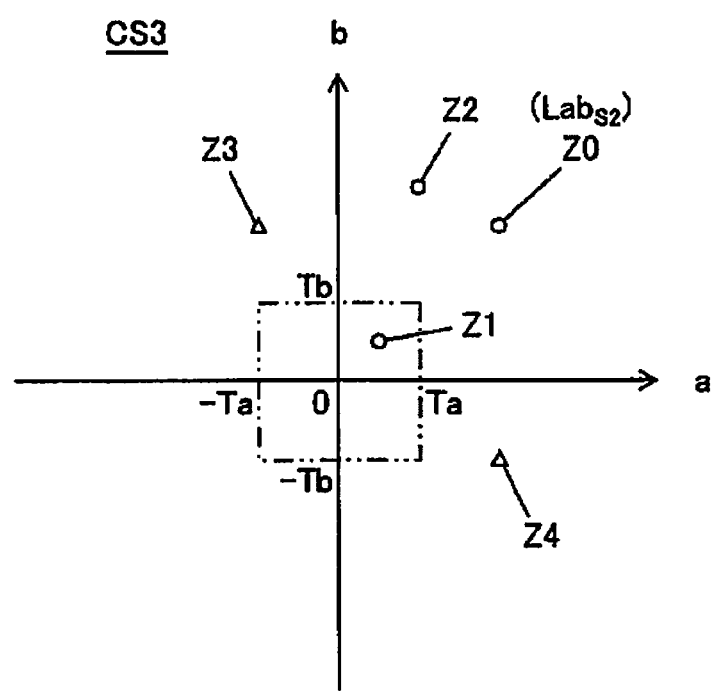
FIG. 11 is a diagram schematically illustrating an example where, from chromatic candidates for the optimal solution, candidates for the optimal solution belonging to quadrants of a hue plane different from a quadrant to which a reference coordinate value belongs are excluded.

Here, the device independent coordinate values (Lab values) resulting from a conversion of the target color values (cmyk$_T$) in accordance with the second conversion table (622) are defined as reference coordinate values (e.g., Lab$_{S2}$). As illustrated in FIG. 10 and FIG. 11, in the optimization step ST2, in a case where colors represented by the candidates for the optimal solution (Lab$_{pb}$) are determined to be chromatic, the optimal solution (Lab$_b$) may be acquired based on the candidate for the optimal solution (Lab$_{pb}$) belonging to the same quadrant of a hue plane (e.g., an ab plane) in the profile connection space CS3 to which the reference coordinate values (Lab$_{S2}$) belong. In a case where the color of the adjustment point P0 is chromatic, the candidates for the optimal solution (Lab$_{pb}$) belonging to quadrants different from the quadrant to which the reference coordinate values (Lab$_{S2}$) belong of the hue plane (ab plane) in the profile connection space CS3 are likely to deviate significantly. Therefore, Aspect 7 can provide a suitable optimization process.

Aspect 8

As illustrated in FIG. 10 and FIG. 11, in the optimization step ST2, whether the candidate for the optimal solution (Lab$_{pb}$) is suitable for acquiring the optimal solution (Lab$_b$) may be determined in accordance with a prescribed determination criterion. In the optimization step ST2, in a case where the plurality of candidates for the optimal solution (Lab$_{pb}$) are determined to be not suitable for acquiring the optimal solution (Lab$_b$), the optimal solution (Lab$_b$) may be determined to be the reference coordinate value (Lab$_{S2}$). Even in a case where none of the acquired plurality of candidates for the optimal solution (Lab$_{pb}$) are suitable for acquiring the optimal solution, a case of no solution is avoided by determining the optimal solution (Lab$_b$) to be the reference coordinate values (Lab$_{S2}$). Hence, Aspect 8 can provide a suitable optimization process.

Aspect 9

A profile adjustment program PRO according to an aspect of the technique causes a computer (e.g., the host apparatus 100) to implement a target acquisition function FU1 corresponding to the target acquisition step ST1, an optimization function FU2 corresponding to the optimization step ST2, and a profile adjustment function FU3 corresponding to the profile adjustment step ST3. Aspect 9 can provide a profile adjustment program improving the color reproduction accuracy of the profile representing the correspondence relationship between the coordinate values in the device dependent color space and the coordinate values in the profile connection space.

Aspect 10

Furthermore, a profile adjustment apparatus (e.g., the host apparatus 100) according to Aspect 10 of the technique includes a target acquisition unit U1 corresponding to the target acquisition step ST1, an optimization unit U2 corresponding to the optimization step ST2, and a profile adjustment unit U3 corresponding to the profile adjustment step ST3. Aspect 10 can provide a profile adjustment apparatus improving the color reproduction accuracy of the profile representing the correspondence relationship between the coordinate values in the device dependent color space and the coordinate values in the profile connection space.

Aspect 11

Moreover, a profile adjustment system SY1 according to Aspect 11 of the technique includes a printing apparatus (for example, a printer 200) for printing a color chart including patches, a colorimetric apparatus 120 executing a colorimetric process on the patches, and the units of Aspect 10.

Aspect 11 can provide a profile adjustment system improving the color reproduction accuracy of the profile representing the correspondence relationship between the coordinate values in the device dependent color space and the coordinate values in the profile connection space.

Moreover, the technique is applicable to a control method for a profile adjustment apparatus, a composite system including the profile adjustment apparatus, a control method for the composite system, a control program for the profile adjustment apparatus, a control program for the composite system, a computer readable medium recording a profile adjustment program and the control programs. The above-described apparatus may include a plurality of separate units.

2. SPECIFIC EXAMPLE OF CONFIGURATION OF PROFILE ADJUSTMENT SYSTEM

FIG. 1 schematically illustrates a configuration example of a profile adjustment system including a profile adjustment apparatus. A profile adjustment system SY1 illustrated in FIG. 1 includes the host apparatus 100 (an example of the profile adjustment apparatus), a display apparatus 130, the colorimetric apparatus 120, and the ink jet-type printer 200. In the host apparatus 100, a central processing unit (CPU) 111, a read only memory (ROM) 112, a random access memory (RAM) 113, a storage device 114, an input device 115, a communication interface (I/F) 118, a colorimetric apparatus I/F 119, and the like are connected to each other, to be able to output and receive information to and from these components. The ROM 112, the RAM 113, and the storage device 114 are memories, and at least the ROM 112 and the RAM 113 are semiconductor memories. The display apparatus 130 displays a screen corresponding to display data from the host apparatus 100, based on the display data. A liquid crystal display panel or the like may be used for the display apparatus 130.

The storage device 114 stores an operating system (OS) not illustrated in the drawings, a profile adjustment program PRO, and the like. The OS, the profile adjustment program PRO, and the like are read into the RAM 113 when appropriate, to be used for an adjustment process for a profile 500. Here, the profile 500 is a generic term for an input profile 610, an output profile 620, and a device link profile 630. At least one of the RAM 113 and the storage device 114 stores various pieces of information, for example, the input profile 610, the output profile 620, the device link profile 630, and an adjustment history not illustrated in the drawings. The storage device 114 may be a nonvolatile semiconductor memory such as a flash memory, a magnetic storage device such as a hard disk, or the like.

The input device 115 may be a pointing device, a hard key including a keyboard, a touch panel attached to a surface of a display panel, or the like. The communication I/F 118 is connected to a communication I/F 210 in the printer 200 to output and receive information such as print data to and from the printer 200. The colorimetric apparatus I/F 119 is connected to the colorimetric apparatus 120 to acquire colorimetric data including colorimetric values, from the colorimetric apparatus 120. Standards to which the I/Fs 118, 119, and 210 conform to may include universal serial bus (USB), near-field communication, and the like. Communication through the communication I/Fs 118, 119, and 210 may be wired or wireless or may be network communication such as through a local area network (LAN) or the Internet.

The colorimetric apparatus 120 is capable of executing a colorimetric process on each color patch formed on a print substrate that is an example of a medium on which a color chart is formed, to output a colorimetric value. The patch is also referred to as a color chip. The colorimetric value is defined as a value representing, e.g., a lightness L and chromaticity coordinates a and b in a CIE Lab color space. The host apparatus 100 acquires colorimetric data from the colorimetric apparatus 120 to execute various processes.

The profile adjustment program PRO illustrated in FIG. 1 causes the host apparatus 100 to implement the target acquisition function FU1, the optimization function FU2, and the profile adjustment function FU3.

The CPU 111 of the host apparatus 100 reads, into the RAM 113, the information stored in the storage device 114 when appropriate and executes the read program to perform various processes. The CPU 111 executes the profile adjustment program PRO read into the RAM 113 to perform processes corresponding to the above-described functions FU1 to FU3. The profile adjustment program PRO causes the host apparatus 100, which is a computer, to function as a target acquisition unit U1, an optimization unit U2, and a profile adjustment unit U3. The host apparatus 100, which executes the profile adjustment program PRO, implements the target acquisition step ST1, the optimization step ST2, and the profile adjustment step ST3. The computer readable medium, which stores the profile adjustment program PRO causing the computer to implement the above-described functions FU1 to FU3, is not limited to the storage device inside the host apparatus but may be a recording medium outside the host apparatus.

Note that examples of the host apparatus 100 include computers such as personal computers (including tablet terminals). For example, in a case where a main body of a desktop personal computer is applied to the host apparatus 100, the display apparatus 130, the colorimetric apparatus 120, and the printer 200 are typically connected to the main body. In a case where a computer such as a display apparatus-integrated laptop personal computer is applied to the host apparatus 100, the colorimetric apparatus 120 and the printer 200 are typically connected to the computer. The display apparatus-integrated host apparatus similarly outputs display data to the internal display apparatus. Furthermore, the host apparatus 100 may include all the components 111 to 119 in one housing but may include a plurality of devices separated from one another in such a manner that allows the devices to communicate with one another. Moreover, the technique can be implemented even in a case where at least a part of the display apparatus 130, the colorimetric apparatus 120, and the printer 200 is included in the host apparatus 100.

The printer 200 (an example of an output device) illustrated in FIG. 1 is assumed to be an ink jet-type printer that discharges (injects) a cyan (C) ink, a magenta (M) ink, a yellow (Y) ink, and a black (K) ink from a recording head 220 as color materials to form an output image IMO corresponding to print data. The recording head 220 is fed with the cyan, magenta, yellow, and black (CMYK) inks from ink cartridges Cc, Cm, Cy, and Ck, respectively, to discharge CMYK ink droplets 280 through respective nozzles Nc, Nm, Ny, and Nk. When the ink droplets 280 land on a print substrate ME1, ink dots are formed on the print substrate ME1. As a result, printed matter is provided including an output image IMO on the print substrate ME1.

3. SPECIFIC EXAMPLE OF COLOR MANAGEMENT SYSTEM

Now, with reference to FIG. 2, an example of a color management system to which the technique is applicable will be described.

Figure 2:
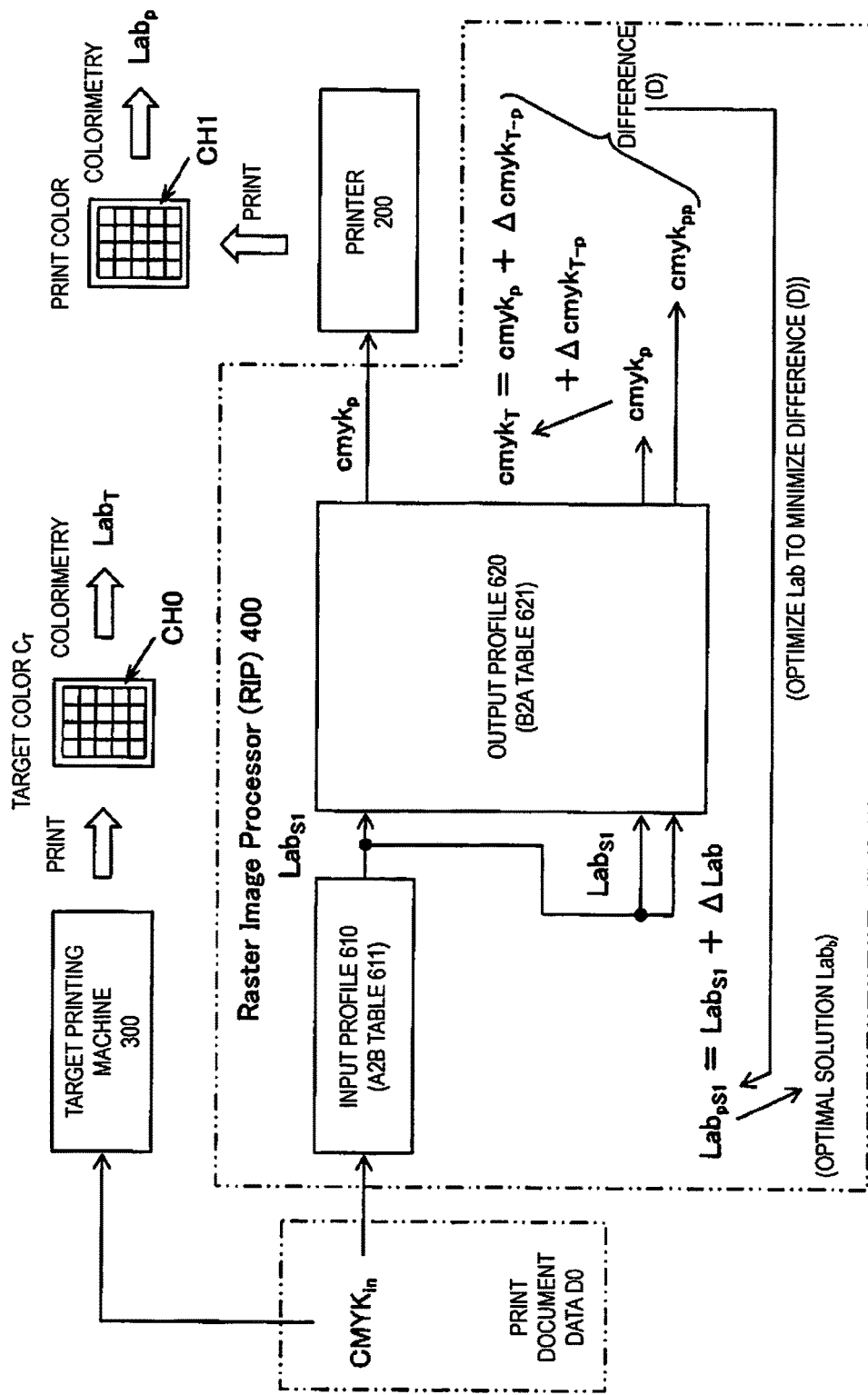
FIG. 2 is a diagram schematically illustrating an example of a color management flow.

The color management system illustrated in FIG. 2, for example, causes a raster image processor (RIP) 400 implemented in the host apparatus 100 to convert print document data DO into output data representing print colors $cmyk_p$ (cyan, magenta, yellow, and black), and causes the ink jet-type printer 200 to form printed matter. The print document data DO represents process colors $CMYK_{in}$ allowing a target color ($C_T$) to be reproduced using CMYK inks (color materials) in a target printing machine 300, an example of a target apparatus for color matching.

The target printing machine 300 is assumed to be an offset printing machine but may be a photogravure press, a flexographic press, or the like. The target color $C_T$ is represented, for example, by a coordinate value (Lab value) in the CIE Lab color space. FIG. 2 illustrates how the target printing machine 300 prints, on the print substrate, a color chart CH0 representing the target color $C_T$ and how the colorimetric apparatus executes a colorimetric process on each patch of the color chart CH0 to acquire a colorimetric value $Lab_T$. The process colors $CMYK_{in}$ correspond to the use amounts of the CMYK inks used in the target printing machine 300, and represent coordinates in the CMYK color space depending on the target printing machine 300.

The RIP 400 illustrated in FIG. 2 includes the input profile 610 and the output profile 620. The input profile 610 is a file describing color properties of inks used in the target printing machine 300. The output profile 620 is a file describing color properties of inks used in the ink jet-type printer 200. For both the profiles 610 and 620, for example, a data format of an ICC profile may be used. The process colors $CMYK_{in}$ in the print document data DO are converted into colors $Lab_{S1}$ in the Lab color space in accordance with an A2B table 611 of the input profile 610, and into print colors $cmyk_p$ in accordance with a B2A table 621 of the output profile 620 (an example of the first conversion table). In a case where the printer 200 uses a total of four inks, i.e., the CMYK inks, the print colors $cmyk_p$ are output to the printer 200, which reproduces the print colors $cmyk_p$ on the printed matter. FIG. 2 illustrates how the printer 200 prints a color chart CH1 representing the print colors $cmyk_p$ on the print substrate and how the colorimetric apparatus 120 executes a colorimetric process on each patch of the color chart CH1 to acquire colorimetric values $Lab_p$. In a case where the printer 200 also uses inks such as light cyan (Lc), light magenta (Lm), dark yellow (DY), and light black (Lk), when the RIP 400 or the printer 200 classifies the print colors $cmyk_p$ into deep colors and light colors, the printer 200 can reproduce the print colors $cmyk_p$ on the printed matter. Of course, the print colors are not limited to a total of four colors, i.e., CMYK.

Note that the RIP 400 also includes an input profile for a conversion between coordinate values in the Lab color space and process colors other than the process colors $CMYK_{in}$, e.g., process colors (denoted as $CMY_{in}$) representing the use amounts of color materials of only three primary colors CMY corresponding to subtractive color mixture or process colors (denoted as $RGB_{in}$) representing the intensities of three primary colors of red (R), green (G), and blue (B) corresponding to additive color mixture. Therefore, the RIP 400 can convert the process colors $CMY_{in}$, the process colors $RGB_{in}$, or the like into print colors $cmyk_p$ via the Lab color space. In addition, the RIP 400 can receive colors $Lab_{S1}$ in the Lab color space to convert the colors into the corresponding print color $cmyk_p$.

As described above, the ink jet-type printer 200 can reproduce colors similar to colors reproduced by the target printing machine 300. However, in actuality, expected colors may fail to be reproduced due to an error in the profile, a color measurement error, a fluctuation in the printer, and the like. In such a case, modifications to the profiles 610 and 620 increase a conversion accuracy of the target color. In a case of modifying the input profile 610, the modification may be performed by arithmetically predicting colorimetric values ($Lab_p$) from adjustment target print colors ($cmyk_T$), calculating a color difference between the resultant simulation values (denoted as $Lab_{S2}$) and target hue values ($Lab_T$), and reducing the color difference.

However, when $cmyk_p$ values are converted into Lab values in accordance with the A2B table 622 of the output profile 620 (an example of the second conversion table, see FIG. 5), an error in the A2B table 622 causes differences between the simulation values $Lab_{S2}$ and the actual target hue values $Lab_T$. Thus, even when the input profile 610 is adjusted, the expected color may fail to be acquired or much time and effort may be unavoidable for the adjustment.

In this specific example, the optimization process is executed in accordance with the B2A table 621 of the output profile 620, thus improving the color reproduction accuracy in a case where the adjusted input profile 610 (at least the A2B table 611) is combined with the output profile 620. FIG. 2 illustrates that PCS values of the adjustment target are optimized to be closest to the target color values $cmyk_T$. The optimized PCS values $Lab_b$ are used for adjustment of the to-be-adjusted input profile 610.

4. SPECIFIC EXAMPLE OF PROFILE

Figure 3:
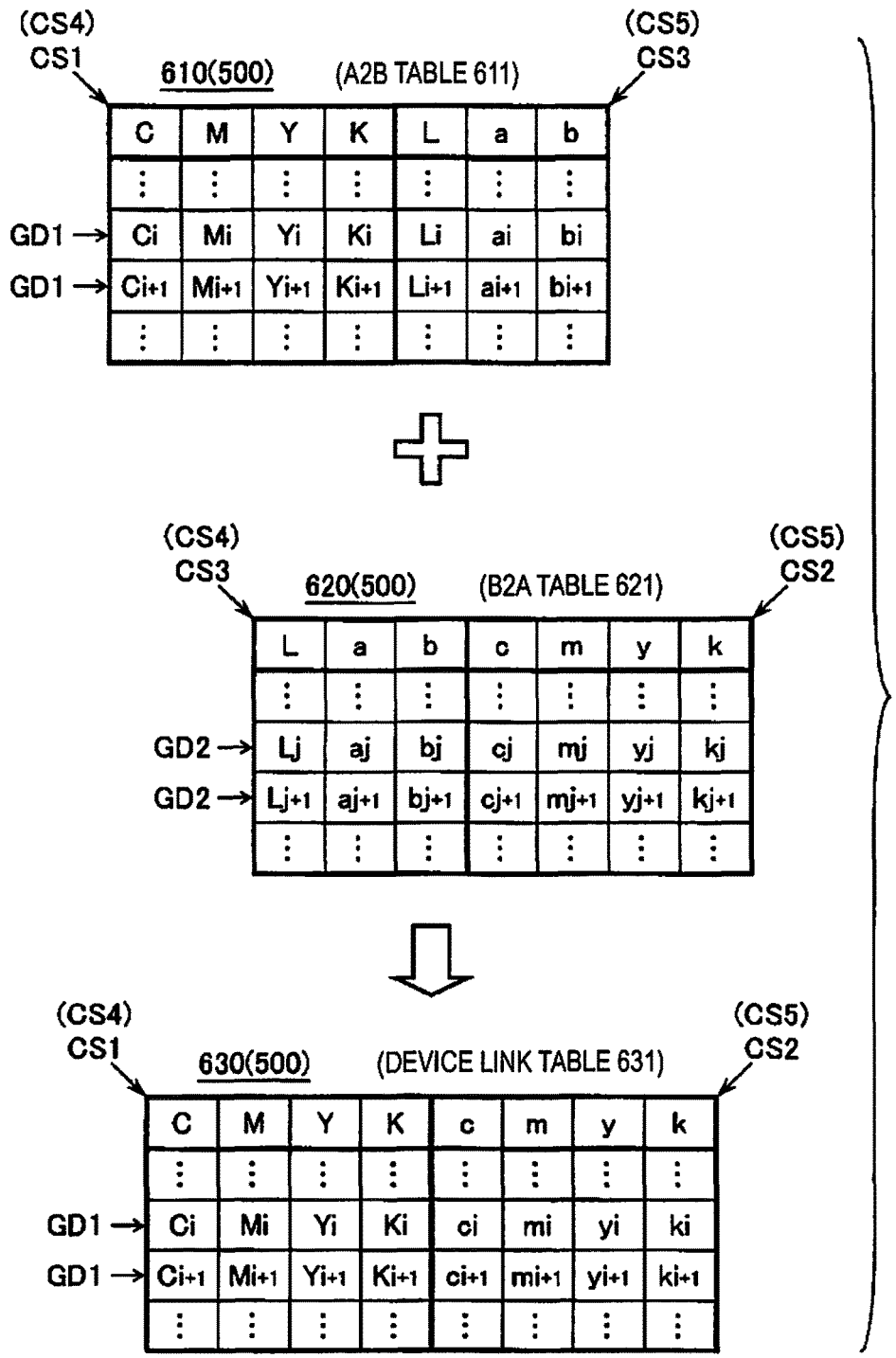
FIG. 3 is a diagram schematically illustrating an example of a relationship between various profiles.

FIG. 3 schematically illustrates a relationship among the input profile 610, the output profile 620, and the device link profile 630.

As illustrated in FIG. 3, the input profile 610 is data specifying a correspondence relationship between CMYK values ($C_i$, $M_i$, $Y_i$, $K_i$) in the CMYK color space (an example of the first device dependent color space CS1) corresponding to the inks used in the target printing machine 300 and Lab values ($L_i$, $a_i$, $b_i$) in the Lab color space (an example of the Profile Connection Space (PCS) CS3). In this case, grid points GD1 in the A2B table 611 are typically arranged in the CMYK color space at substantially equal intervals in a C axis direction, an M axis direction, a Y axis direction, and a K axis direction. Here, the variable i is a variable identifying each grid point GD1 set in the CMYK color space (CS1). The CMYK values are an example of first coordinate values. The Lab values are an example of device independent coordinate values. In the input profile 610, the CMYK color space (CS1) is an example of an input color space CS4, and the Lab color space (CS3) is an example of an output color space CS5. Note that the first device dependent color space is also referred to as a first color space.

The output profile 620 is data specifying a correspondence relationship between Lab values ($L_j$, $a_j$, $b_j$) in the Lab color space (CS3) and cmyk values ($c_j$, $m_j$, $y_j$, $k_j$) in the cmyk color space (an example of the second device dependent color space CS2) corresponding to the inks used in the ink jet-type printer 200. In this case, grid points GD2 in the B2A table 621 are typically arranged in the Lab color space at substantially equal intervals in an L axis direction, an a axis direction and a b axis direction. Here, the variable j is a variable identifying each grid point GD2 set in the Lab color space (CS3). The expression "cmyk color space" is used to distinguish the color space corresponding to the inks used in the printer 200 from the color space corresponding to the inks used in the target printing machine 300. The cmyk values are an example of second coordinate values. In the output profile 620, the Lab color space (CS3) is an example of the input color space CS4, and the cmyk color space (CS2) is an example of the output color space CS5. A color reproduction region of the output color ($cmyk_p$) represented by the cmyk values depends on the printer 200. Therefore, even when Lab values ($L_j$, $a_j$, $b_j$) in the B2A table 621 represent a point outside the color reproduction region, the cmyk values ($c_j$, $m_j$, $y_j$, $k_j$) resulting from mapping to a color reproduction region of the printer 200 are associated with the Lab values ($L_j$, $a_j$, $b_j$).

Note that the second device dependent color space is also referred to as a second color space.

The device link profile 630 is data specifying a correspondence relationship between CMKY values ($C_i$, $M_i$, $Y_i$, $K_i$) in the CMYK color space (CS1) and cmyk values ($c_i$, $m_i$, $y_i$, $k_i$) in the cmyk color space (CS2). In this case, each grid point GD1 in a device link table 631 is a corresponding grid point in the A2B table 611 of the input profile 610. Here, the variable i is a variable identifying each grid point GD1 set in the CMYK color space (CS1). The device link profile 630 is acquired by merging the input profile 610 (particularly the A2B table 611) and the output profile 620 (particularly the B2A table 621). In the device link profile 630, the CMYK color space (CS1) is an example of the input color space CS4, and the cmyk color space (CS2) is an example of the output color space CS5.

Note that the conversion table included in each of the profiles 610, 620, and 630 is not limited to a single conversion table but may be a combination of a plurality of conversion tables such as a combination of a one-dimensional conversion table, a three- or four-dimensional conversion table, and a one-dimensional table. Hence, the conversion tables illustrated in FIG. 3 may directly illustrate three- or four-dimensional conversion tables included in the profiles 610, 620, and 630 or illustrate a combination of a plurality of conversion tables included in the profiles 610, 620, and 630.

Furthermore, the grid points mean virtual points arranged in the input color space, and output coordinate values corresponding to the position of each grid point in the input color space are assumed to be stored at the grid point. The technique includes not only even arrangement of a plurality of grid points in the input color space but also uneven arrangement of a plurality of grid points in the input color space.

Figure 4:
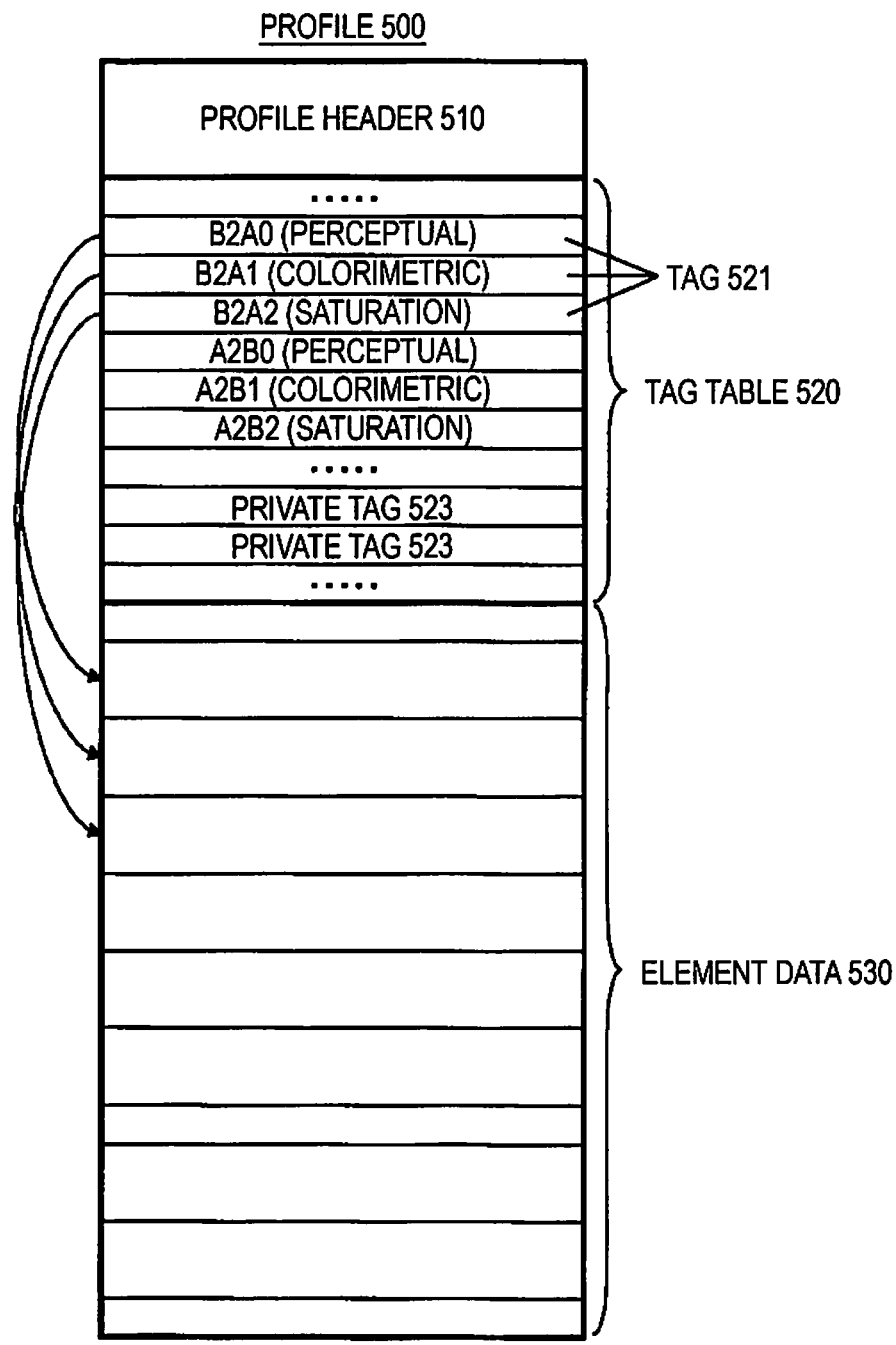
FIG. 4 is a diagram schematically illustrating a structure example of a profile.

FIG. 4 schematically illustrates the structure of the profile 500, particularly the input profile 610 and the output profile 620. The profile 500 illustrated in FIG. 4 is an ICC profile and includes a profile header 510 and a tag table 520. The profile 500 includes tags 521 that are information used to convert color information between the PCS and the device dependent color space. The tags 521 may include private tags 523 used to customize the profile 500.

A2Bx tags for the devices (300 and 200) (x illustrated in FIG. 4 is 0, 1, or 2) include, as element data 530, a color conversion table used to convert the device dependent color space (CMYK color space or cmyk color space) into the Lab color space. B2Ax tags for the devices (300 and 200) include, as the element data 530, a color conversion table used to convert the Lab color space into the device dependent color space (CMYK color space or cmyk color space).

An A2B0 tag and a B2A0 tag illustrated in FIG. 4 are information used for a perceptual color conversion. The perceptual color conversion focuses on tone reproduction and is thus mostly used for a conversion of photographic images with a wide color gamut. An A2B1 tag and a B2A1 tag illustrated in FIG. 4 are information used for a media-relative colorimetric color conversion or an absolute colorimetric color conversion. The colorimetric color conversion is faithful to colorimetric values, and is thus mostly used for a conversion for digital-proof color calibration output for which accurate color matching is indispensable. An A2B2 tag and a B2A2 tag illustrated in FIG. 4 are information used for color conversion focusing on saturation. The color conversion focusing on saturation focuses more on saturation of colors than on the accuracy of hue and is mostly used for a conversion of graph display and the like in business graphics.

Figure 5:
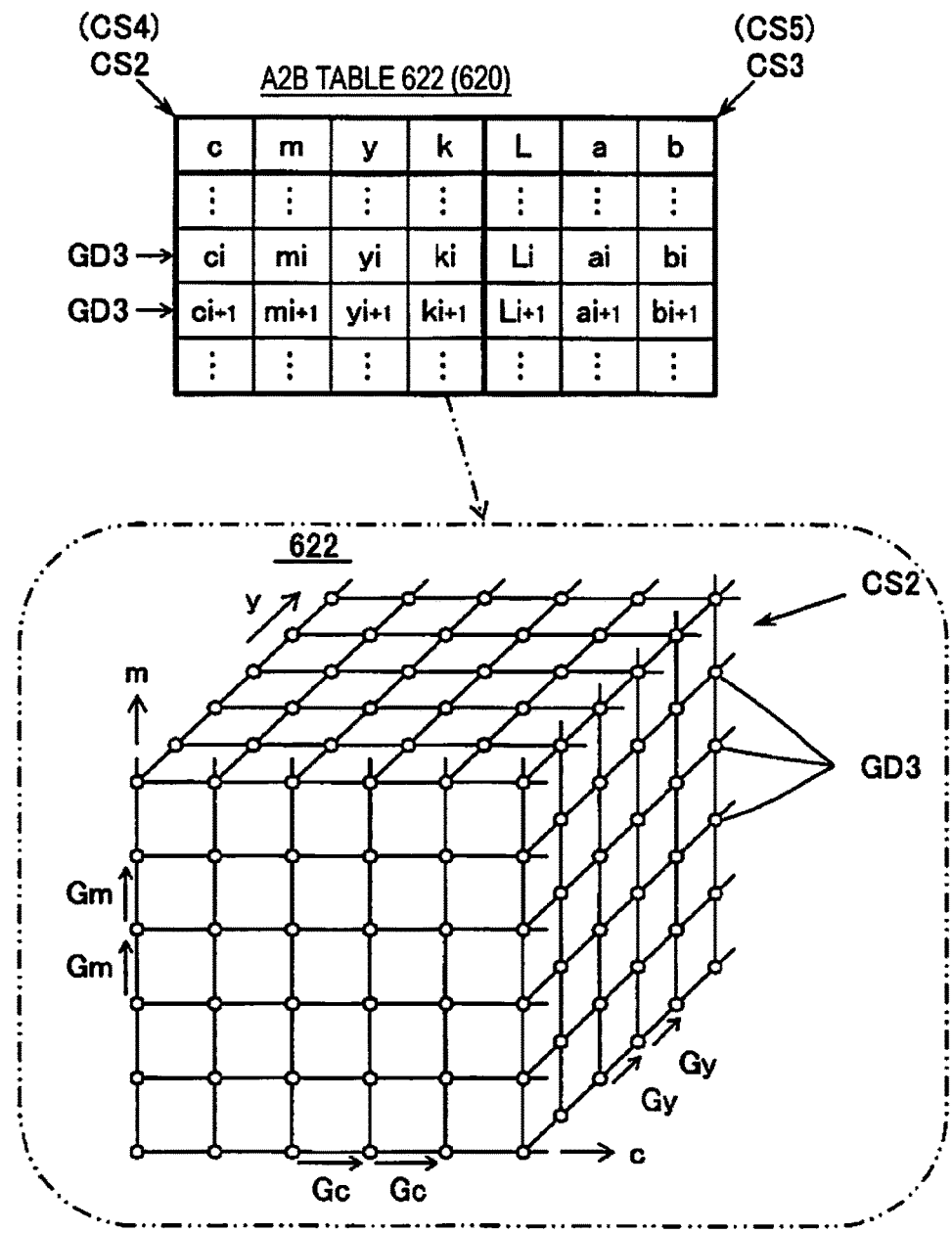
FIG. 5 is a block diagram schematically illustrating a structure example of a second conversion table of an output profile.

FIG. 5 schematically illustrates the structure of the A2B conversion table 622 (an example of the second conversion table) of the output profile 620. A lower portion of FIG. 5 schematically illustrates the positions of grid points GD3 in the cmyk color space (CS2). Here, the cmyk color space is a four-dimensional color space, and thus, FIG. 5 illustrates a three-dimensional virtual space formed from a c axis, an m axis, and a y axis. The grid points GD3 in the A2B table 622 are typically arranged in the cmyk color space at substantially equal intervals in a c axis direction, an m axis direction, a y axis direction, and a k axis direction. In the lower portion of FIG. 5, the interval between the grid points GD3 in the c axis direction is denoted as Gc, the interval between the grid points GD3 in the m axis direction is denoted as Gm, and the interval between the grid points GD3 in the y axis direction is denoted as Gy. Lab values ($L_i$, $a_i$, $b_i$) in the A2B table 622 are coordinate values representing corresponding output colors (cmyk values $c_i$, $m_i$, $y_i$, $k_i$) in the color reproduction region of the printer 200. Here, the variable i is a variable identifying each grid point GD3 set in the cmyk color space (CS2). Of course, the conversion table illustrated in FIG. 5 may directly illustrate a four-dimensional conversion table included in the output profile 620 or illustrate a combination of a plurality of conversion tables included in the output profile 620.

As illustrated in FIG. 3 and FIG. 5, the output profile 620 includes the B2A table 621, used for a color conversion from Lab values into cmyk values, and the A2B table 622, used for a color conversion of cmyk values into Lab values. The B2A table 621 is a three-dimensional color conversion table subjected to gamut mapping, and the A2B table 622 is a four-dimensional color conversion table in which cmyk values representing colors that can be output are associated with PCS values. Therefore, when PCS values $Lab_{S1}$ are converted into cmyk values $cmyk_p$ in accordance with the B2A table 621 and the cmyk values $cmyk_p$ are then converted into PCS values $Lab_{S2}$ in accordance with the A2B table 622, the PCS values $Lab_{S2}$ may fail to be the original PCS values $Lab_{S1}$.

5. SPECIFIC EXAMPLE OF PROCESS EXECUTED BY PROFILE ADJUSTMENT SYSTEM

Figure 6:
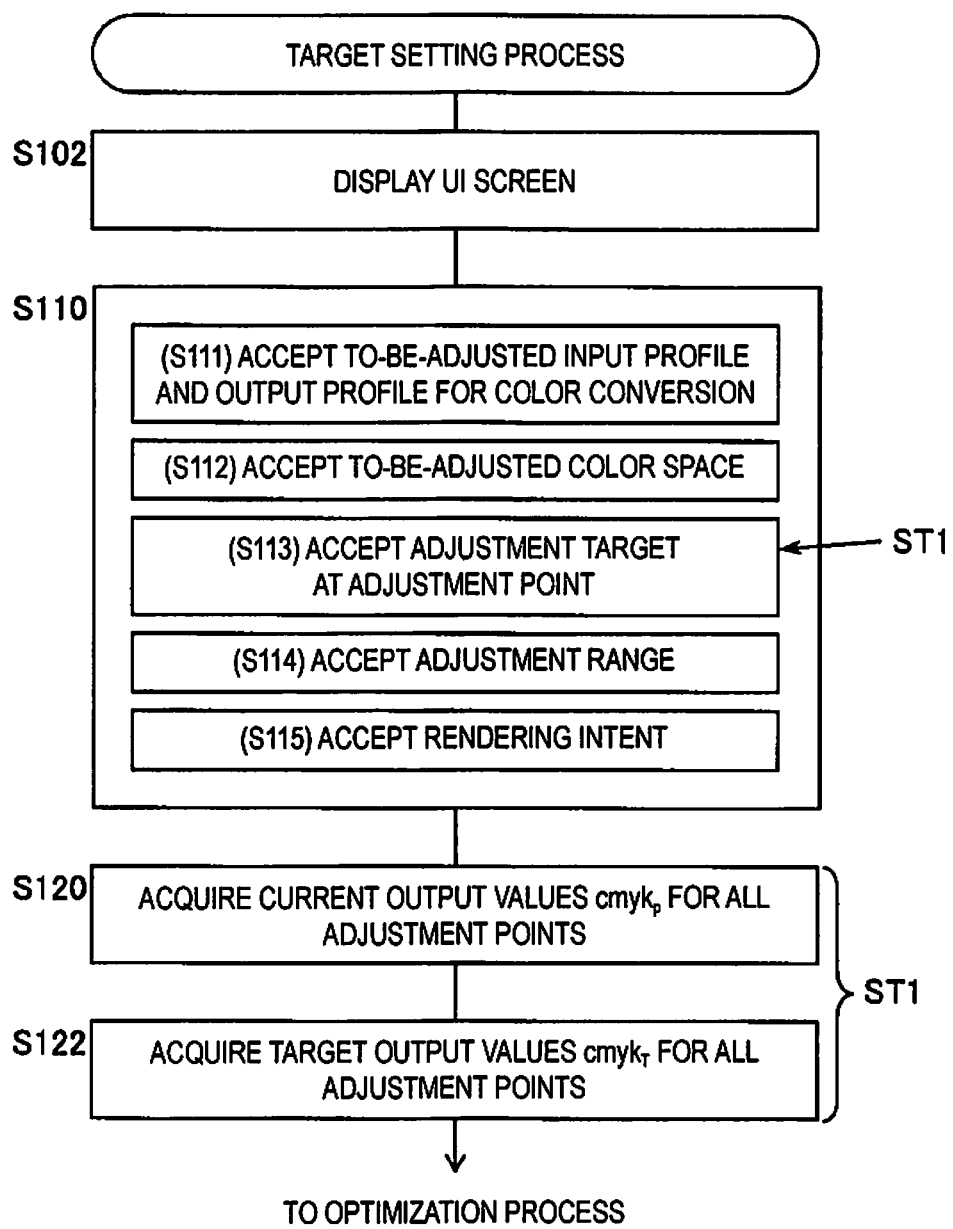
FIG. 6 is a flowchart illustrating an example of a target setting process.
Figure 7:
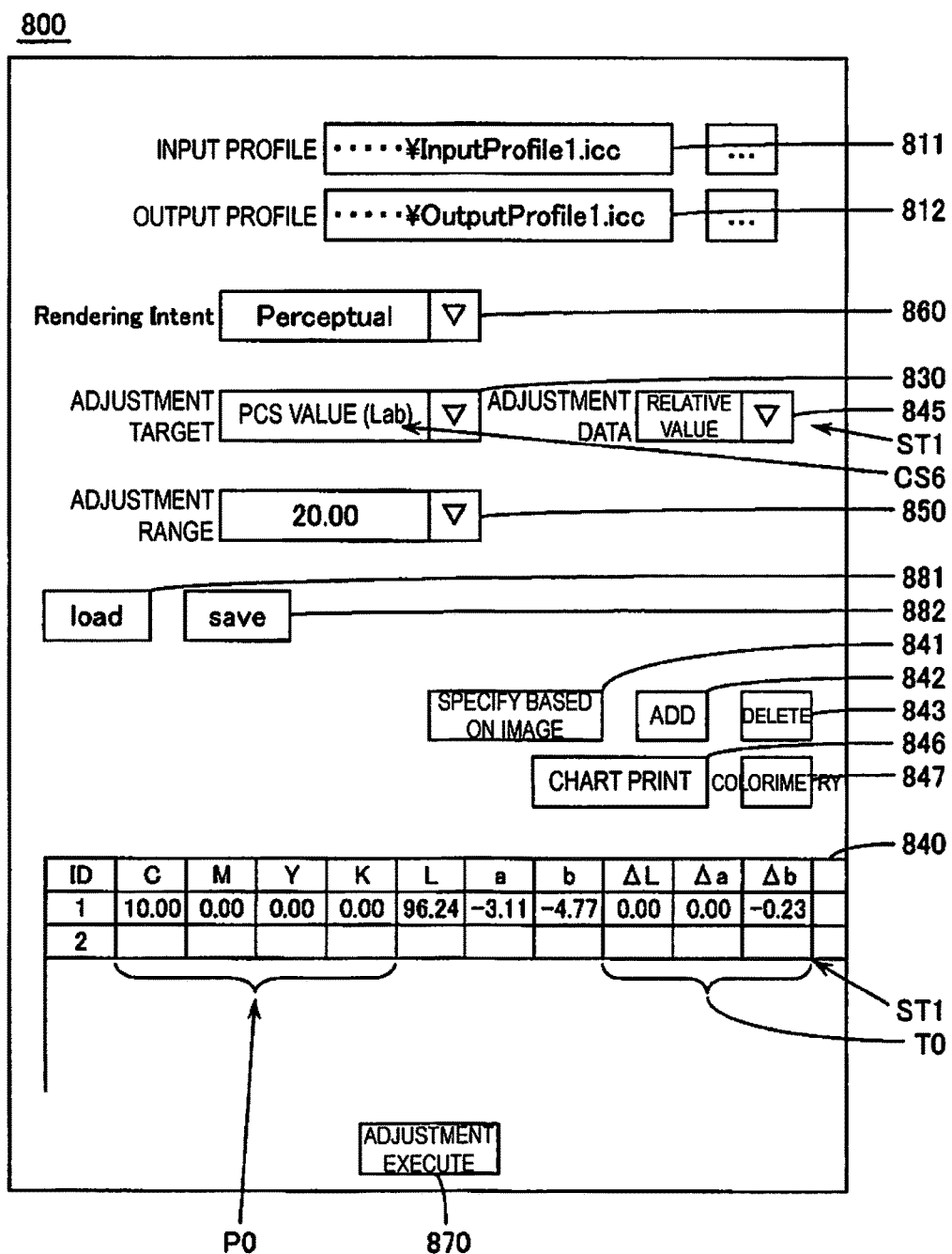
FIG. 7 is a diagram schematically illustrating an example of a user interface screen.

FIG. 6 illustrates a target setting process to be executed by the host apparatus 100 illustrated in FIG. 1. After the target setting process, the optimization process illustrated in FIG. 8 is executed. Note that the host apparatus 100 executes a plurality of processes in parallel based on multitasking. FIG. 7 illustrates an example of a user interface (UI) screen 800 displayed in step S102 in FIG. 6. Here, steps S113 and S120 to S122 in FIG. 6 correspond to the target acquisition step ST1, the target acquisition function FU1, and the target acquisition unit U1.

When the target setting process illustrated in FIG. 6 is started, the host apparatus 100 causes the display apparatus 130 to display the UI screen 800, illustrated in FIG. 7 (S102). The UI screen 800 includes an input profile selection section 811, an output profile selection section 812, an adjustment target color space selection section 830, a target acceptance area 840, a "specify based on image" button 841, an add button 842, a delete button 843, an adjustment data selection section 845, a chart print button 846, a colorimetry button 847, an adjustment range specification section 850, an intent specification section 860, an adjustment execute button 870, a history load button 881, and a history save button 882.

The host apparatus 100 accepts operations on any of the above-described sections and buttons through the input device 115 (S110), and upon acceptance of an operation on the adjustment execution button 870, advances the process to S120. The process in S110 includes the following processes S111 to S115.

(S111) A process for accepting specifications of the to-be-adjusted input profile 610 and the output profile 620 for color conversion.

(S112) A process for accepting any one of the CMYK color space (CS1), the cmyk color space (CS2), and the PCS CS3 as a to-be-adjusted color space CS6.

(S113) A process for accepting an input of an adjustment target T0 at an adjustment point P0 based on the coordinates in the to-be-adjusted color space CS6.

(S114) A process for accepting specification of an adjustment range A0 (see FIG. 13) of the to-be-adjusted input profile 610 in the CMYK color space (CS1), the adjustment range A0 being to be adjusted based on the adjustment target T0.

(S115) A process for accepting, as a specification intent, any one of a plurality of rendering intents for defining the correspondence relationship for the to-be-adjusted input profile 610.

First, with reference to FIG. 7, the process in S111 will be described.

When accepting an operation through the input device 115 on the input profile selection section 811, the host apparatus 100 can cause the display apparatus 130 to display a list of the input profiles 610 stored in the storage device 114. The host apparatus 100 accepts, from the input device 115, one input profile in the displayed list of the input profiles 610 as the adjustment target.

Furthermore, when accepting an operation on the output profile selection section 812 through the input device 115, the host apparatus 100 can cause the display apparatus 130 to display a list of the output profiles 620 stored in the storage device 114. The host apparatus 100 accepts, from the input device 115, one output profile in the displayed list of the output profiles 620 as the output profile 620 for color conversion.

Next, with reference to FIG. 7, the process in S112 will be described.

A plurality of selection items in the to-be-adjusted color space selection section 830 illustrated in FIG. 7 include "input data", "output data", and "PCS value". The "input data" is an item for selecting the CMYK color space (CS1) as the to-be-adjusted color space CS6. The "output data" is an item for selecting the cmyk color space (CS2) as the to-be-adjusted color space CS6. The "PCS value" is an item for selecting the Lab color space (CS3) as the to-be-adjusted color space CS6. The host apparatus 100 accepts, from the input device 115, one of the "input data", the "output data", and the "PCS value" as the to-be-adjusted color space CS6.

Note that the to-be-adjusted color space selection section 830 may lack one or two of the "input data", the "output data", and the "PCS value". Of course, the to-be-adjusted color space CS6 may be predetermined to be any one of the CMYK color space (CS1), the cmyk color space (CS2), and the PCS CS3.

Moreover, with reference to FIGS. 7 and 13, the process in S113 will be described.

The host apparatus 100 executes a process for changing the input item of the target acceptance area 840 according to the selection in the above-described to-be-adjusted color space selection section 830. Furthermore, the host apparatus 100 executes a process for changing the input item of the target acceptance area 840 according to the selection in the adjustment data selection section 845. In the adjustment data selection section 845, either one of "absolute value" and "relative value" can be selected. The "absolute value" is an option allowing the adjustment target T0 to be accepted as a coordinate value in the color space. The "relative value" is an option allowing the adjustment target T0 to be accepted as a difference from the current coordinate value in the color space.

First, in a case where the specification of the "PCS value" in the adjustment data selection section 845 is accepted, i.e., in a case where the to-be-adjusted color space CS6 is the PCS CS3, the following process is executed.

When accepting the "relative value" in the adjustment data selection section 845, the host apparatus 100 causes an input section for the coordinate values ($\Delta L$, $\Delta a$, $\Delta b$) of the adjustment target T0, as relative values (denoted by $\Delta Lab_{T-p}$) relative to the current coordinate values in the PCS CS3, to be displayed in the target acceptance area 840, as illustrated in FIG. 7. Furthermore, when accepting the "absolute value" in the adjustment data selection section 845, the host apparatus 100 causes an input section for the coordinate values (denoted by T_L, T_a, T_b) of the adjustment target T0 along with a display section for the current coordinate values (denoted by C_L, C_a, C_b) in the PCS CS3 to be displayed in the target acceptance area 840.

In a case where the specification of the "input data" in the adjustment data selection section 845 is accepted, i.e., in a case where the to-be-adjusted color space CS6 is the CMYK color space (CS1), the following process is executed.

When accepting the "relative value" in the adjustment data selection section 845, the host apparatus 100 causes an input section for the coordinate values (denoted by $\Delta C$, $\Delta M$, $\Delta Y$, $\Delta K$) of the adjustment target T0, as relative values (denoted by $\Delta CMYK_{T-p}$) relative to the current coordinate values in the CMYK color space (CS1), to be displayed in the target acceptance area 840. Furthermore, when accepting the "absolute value" in the adjustment data selection section 845, the host apparatus 100 causes an input section for the coordinate values (denoted by T_C, T_M, T_Y, T_K) of the adjustment target T0 along with a display section for the current coordinate values (denoted by C_C, C_M, C_Y, C_K) in the CMYK color space (CS1) to be displayed in the target acceptance area 840.

In a case where the specification of the "output data" in the adjustment data selection section 845 is accepted, i.e., in a case where the to-be-adjusted color space CS6 is the cmyk color space (CS2), the following process is executed.

When accepting the "relative value" in the adjustment data selection section 845, the host apparatus 100 causes an input section for the coordinate values (denoted by $\Delta c$, $\Delta m$, $\Delta y$, $\Delta k$) of the adjustment target T0, as relative values (denoted by $\Delta cmyk_{T-p}$) relative to the current coordinate values in the cmyk color space (CS2), to be displayed in the target acceptance area 840. Furthermore, when accepting the "absolute value" in the adjustment data selection section 845, the host apparatus 100 causes an input section for the coordinate values (denoted by T_c, T_m, T_y, T_k) of the adjustment target T0 along with a display section for the current coordinate values (denoted by C_c, C_m, C_y, C_k) in the cmyk color space (CS2) to be displayed in the target acceptance area 840.

Figure 13:
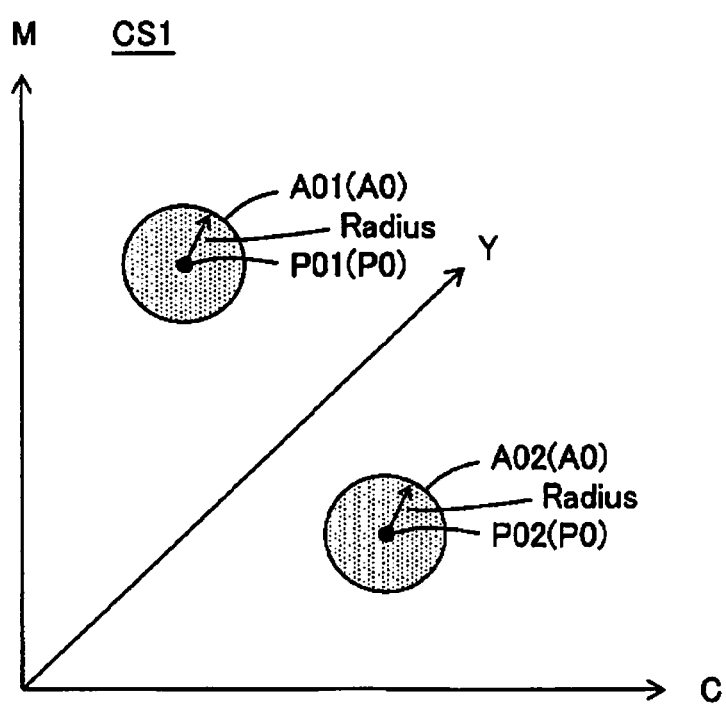
FIG. 13 is a diagram schematically illustrating an example where adjustment points are set.

As illustrated in FIG. 13, the adjustment point P0 for which the adjustment target T0 is to be set is set in the CMYK color space (CS1). Here, the CMYK color space is a four-dimensional color space, and thus, FIG. 13 illustrates a three-dimensional virtual space formed from a C axis, an M axis, and a Y axis. Note that although FIG. 13 illustrates two adjustment points P01 and P02 as the adjustment point P0, one, or three or more adjustment points P0 may be set. For example, when accepting an operation on the "specify based on image" button 841 in the UI screen 800 illustrated in FIG. 7, the host apparatus 100 causes the display apparatus 130 to display a screen schematically depicting the CMYK color space (CS1), and acquires CMYK values corresponding to an operation through the input device 115 to update the information of the target acceptance area 840. When a new adjustment point P0 is specified, the host apparatus 100 provides a corresponding ID (identification information) and causes the acquired CMYK values, Lab values obtained from the CMYK values, and the like to be displayed in the target acceptance area 840 in association with the ID. When the add button 842 is operated, the host apparatus 100 provides an additional ID, and adds, to the target acceptance area 840, an input section corresponding to the added ID. When the delete button 843 is operated, the host apparatus 100 accepts a specification of an ID to be deleted, and deletes the input section corresponding to the specified ID.

Furthermore, when accepting an operation on the chart print button 846, the host apparatus 100 generates print data of the color chart CH1 with color patches each representing the color of corresponding adjustment point P0 and transmits the print data to the printer 200. The printer 200 receives the print data and then prints, on a print substrate ME1, the color chart CH1 with the color patches each representing the color of corresponding adjustment point P0.

Moreover, when accepting an operation on the colorimetry button 847, the host apparatus 100 instructs the colorimetric apparatus 120 to execute a colorimetric process on each patch of the color chart CH1. The colorimetric apparatus 120 receives the instruction, then executes a colorimetric process on each patch of the color chart CH1, and transmits the colorimetric values ($Lab_p$) of each patch to the host apparatus 100. The host apparatus 100 receives the colorimetric values ($Lab_p$) and may then cause the display apparatus 130 to display the colorimetric values ($Lab_p$) or cause the printer 200 to print the colorimetric values ($Lab_p$). A user may view the output colorimetric values ($Lab_p$) and input the adjustment target T0 to the target acceptance area 840. Furthermore, the host apparatus 100 may automatically input the colorimetric values ($Lab_p$) of each patch to an input section for the target T0. In a case where the adjustment target T0 is the relative value ($\Delta L$, $\Delta a$, $\Delta b$), the host apparatus 100 may calculate differences between the components L, a, and b of the target colorimetric values $Lab_T$ and the components L, a, and b of the current colorimetric values $Lab_p$ and automatically input the differences to the input section for the target T0.

Moreover, when accepting an operation on the history load button 881, the host apparatus 100 reads an adjustment history stored in the storage device 114, and adds the adjustment history to the target acceptance area 840. When an operation on the history save button 882 is accepted, the host apparatus 100 stores the information of the target acceptance area 840 in the storage device 114 as an adjustment history.

Moreover, with reference to FIGS. 7 and 13, the process in S114 will be described.

The host apparatus 100 accepts, in the adjustment range specification section 850, an input of a radius on the assumption that the adjustment point P0 is a base point. The radius is represented, e.g., as a relative Euclid distance value 0 to 100% in the first color space CS1. Consequently, the adjustment range A0 of the input profile 610 is specified in the first color space CS1. Note that, in the present application, "Min to Max" means the minimum value Min or greater and the maximum value Max or smaller.

FIG. 13 schematically illustrates an example of the adjustment range A0 in a case where the radius is specified. The adjustment range A0 is set for each adjustment point P0. In the example illustrated in FIG. 13, an adjustment range A01 is set for the adjustment point P01, and an adjustment range A02 is set for the adjustment point P02. The host apparatus 100 is capable of accepting, in the target acceptance area 840, an input of the adjustment range A0 of each adjustment point P0.

Moreover, with reference to FIG. 7, the process in S115 will be described.

The host apparatus 100 accepts, in the intent specification section 860, a specification of a rendering intent for defining the correspondence relationship for the input profile 610. Although illustration is omitted in the drawing, a plurality of specification items for the intent specification section 860 illustrated in FIG. 7 are three types of items: "Perceptual", "Relative Colorimetric", and "Saturation". Of course, the specification items may include "Absolute Colorimetric" or lack one or two of "Perceptual", "Relative Colorimetric", and "Saturation". FIG. 7 illustrates an example where "Perceptual" is specified as a specified intent.

When accepting an operation on the adjustment execute button 870 illustrated in FIG. 7, the host apparatus 100 acquires the to-be-adjusted color values $cmyk_p$ that is the current output values for each adjustment point P0 input to the target acceptance area 840 (S120). This operation is performed to make adjustment based on the output colors ($cmyk_p$) corresponding to the colors of an output image IMO formed on the print substrate ME1.

Here, a conversion in accordance with the profile (e.g., the ICC profile) is to be represented by $f_{icc}$ (a first argument, a second argument, a third argument). The first argument represents a profile used. In the first argument, InputProfile represents an input profile, and OutputProfile represents an output profile. The second argument represents a color conversion table used for the profile represented by the first argument. In the second argument, A2B represents a conversion from a device color to a device independent color, and B2A represents a conversion from a device independent color to a device color. The third argument represents the input values (CYMK, RGB, Lab, or the like) of the adjustment point P0.

In the input profile 610, the input values for each adjustment point P0 are CMYK values $CMYK_{in}$ (respective components (values) are denoted by Cp, Mp, Yp, and Kp). The PCS values $Lab_{S1}$ acquired in accordance with the input profile 610 may be calculated by the following equation.

$$Lab_{S1} = f_{icc}(\text{InputProfile}, A2B, CMYK_{in})$$

The to-be-adjusted color values $cmyk_p$, which are the current output values (respective components (values) are denoted by cp, mp, yp, and kp), may be calculated by the following equation.

$$cmyk_p = f_{icc}(\text{OutputProfile}, B2A, Lab_{S1}) =$$
$$f_{icc}(\text{OutputProfile}, B2A, f_{icc}(\text{InputProfile}, A2B, CMYK_{in}))$$

After acquisition of the to-be-adjusted color values $cmyk_p$, the host apparatus 100 obtains the target color values $cmyk_T$, which are target output values, for each adjustment point P0 input to the target acceptance area 840 (S122).

In a case where the to-be-adjusted color space CS6 is the CMYK color space (CS1), given the absolute values T_C, T_M, T_Y, and T_K (denoted by $CMYK_T$) of the adjustment target T0, the target color values $cmyk_T$ are obtained by the following equation.

$$cmyk_T = f_{icc}(\text{OutputProfile}, B2A, f_{icc}(\text{InputProfile}, A2B, CMYK_T))$$

Given the relative values $\Delta CMYK_{T-p}$ of the adjustment target T0, the target color values $cmyk_T$ are obtained by the following equation in conjunction with the input values $CMYK_{in}$.

$$cmyk_T = f_{icc}(\text{OutputProfile}, B2A, f_{icc}(\text{InputProfile}, A2B, CMYK_{in} + \Delta CMYK_{T-p}))$$

In a case where the to-be-adjusted color space CS6 is the cmyk color space (CS2), given the absolute values T_c, T_m, T_y, and T_k of the adjustment target T0, these are the target color values $cmyk_T$.

Given the relative values $\Delta cmyk_{T-p}$ of the adjustment target T0, the target color values $cmyk_T$ are obtained in conjunction with the input values $CMYK_{in}$ by the following equation.

$$cmyk_T = f_{icc}(\text{OutputProfile}, B2A, f_{icc}(\text{InputProfile}, A2B, CMYK_{in})) + \Delta cmyk_{T-p}$$

In a case where the to-be-adjusted color space CS6 is the PCS CS3, given the absolute values T_L, T_a, and T_b (denoted by $Lab_T$) of the adjustment target T0, the target color values $cmyk_T$ are obtained by the following equation.

$$cmyk_T = f_{icc}(\text{OutputProfile}, B2A, Lab_T)$$

Given the relative values $\Delta Lab_{T-p}$ of the adjustment target T0, the target color values $cmyk_T$ are obtained by the following equation in conjunction with the input values $CMYK_{in}$.

$$cmyk_T = f_{icc}(\text{OutputProfile}, B2A, f_{icc}(\text{InputProfile}, A2B, CMYK_{in}) + \Delta Lab_{T-p}))$$

As described above, the host apparatus 100 acquires, for each adjustment point P0, the adjustment target T0 ($cmyk_T$) based on the coordinates in the cmyk color space (CS2).

After the process in S122, the host apparatus 100 executes the optimization process illustrated in FIG. 8. The optimization process corresponds to the optimization step ST2, the optimization function FU2, and the optimization unit U2. In the specific example, a Broyden-Fletcher-Goldfarb-Shanno (BFGS) method in the quasi-Newton method is used for a solution search process in S210. Of course, a quasi-Newton method other than the BFGS method, e.g., a DFP method, may be used for the solution search process in S210. Furthermore, besides the quasi-Newton method, the Newton method, the conjugate gradient method, or the like may be used for the solution search process in S210.

When the optimization process illustrated in FIG. 8 is started, the host apparatus 100 converts the target color values $\mathrm{cmyk}_T$ into the PCS values $\mathrm{Lab}_{S2}$ (an example of the reference coordinate values) in accordance with the A2B table 622 of the output profile 620 (S202). The PCS values $\mathrm{Lab}_{S2}$ are the initial values $\mathrm{Lab}_0$ of the provisional PCS values $\mathrm{Lab}_{pS1}$ as illustrated in FIG. 9.

In the subsequent step S204, the host apparatus 100 sets the initial values $\mathrm{Lab}_i$ of the provisional PCS values $\mathrm{Lab}_{pS1}$, based on the above-described initial values $\mathrm{Lab}_0$. The variable i in this case is a variable that identifies the initial values.

FIG. 9 schematically illustrates an example where the initial values $\mathrm{Lab}_i$ of the provisional PCS values $\mathrm{Lab}_{pS1}$ are changed. In FIG. 9, a hatched circle indicates the position $(L_0, a_0, b_0)$ of the reference coordinate values $\mathrm{Lab}_1=\mathrm{Lab}_{S2}$. Here, the components (values) of relative values $\Delta\mathrm{Lab}$ of the initial values are represented by $(\Delta Li, \Delta ai, \Delta bi)$. The position of the initial values $\mathrm{Lab}_i$ is represented by $(L_0+\Delta Li, a_0+\Delta ai, b_0+\Delta bi)$. The relative values of the reference coordinate values $\mathrm{Lab}_1$ is $(\Delta Li, \Delta ai, \Delta bi)=(0, 0, 0)$. In the specific example, the initial values $\mathrm{Lab}_i$ includes 2×2×2=8 patterns acquired by shifting the L value by ±SL (SL>0), shifting the a value by ±Sa (Sa>0), and shifting the b value by ±Sb (Sb>0), with respect to the reference coordinate values $(L_0, a_0, b_0)$. The relative values $(\Delta Li, \Delta ai, \Delta bi)$ of a total of nine patterns of initial values $\mathrm{Lab}_i$ are as follows:

$(\Delta Li, \Delta ai, \Delta bi)=(0,0,0)$ $(\Delta Li, \Delta ai, \Delta bi)=(+SL,+Sa,+Sb)$ $(\Delta Li, \Delta ai, \Delta bi)=(+SL,+Sa,-Sb)$ $(\Delta Li, \Delta ai, \Delta bi)=(+SL,-Sa,+Sb)$ $(\Delta Li, \Delta ai, \Delta bi)=(+SL,-Sa,-Sb)$ $(\Delta Li, \Delta ai, \Delta bi)=(-SL,+Sa,+Sb)$ $(\Delta Li, \Delta ai, \Delta bi)=(-SL,+Sa,-Sb)$ $(\Delta Li, \Delta ai, \Delta bi)=(-SL,-Sa,+Sb)$ $(\Delta Li, \Delta ai, \Delta bi)=(-SL,-Sa,-Sb)$ Of course, the number of patterns of initial values is not limited to 8 but may be 27, 81, or the like.

Note that, in the PCS CS3, the range of the L value is not limited but may be from 0 to 100 (0≤L≤100). In the PCS CS3, the ranges of the a value and the b value are not limited but may be from −128 to 127 (−128≤a≤127 and −128≤b≤127).

The distances of the initial values 2×SL, 2×Sa, and 2×Sb for surrounding the reference coordinate values $\mathrm{Lab}_1$ may be from approximately 5 to 20% of the possible ranges of the PCS values, for example. This is expressed as follows:

0.05×100≤2×SL≤0.2×100

0.05×255≤2×Sa≤0.2×255

0.05×255≤2×Sb≤0.2×255

When the distances of the initial values 2×SL, 2×Sa, and 2×Sb are from approximately 5 to 20% of the possible ranges of the PCS values, the optimal solution $\mathrm{Lab}_b$ can be efficiently determined.

After setting of the initial values $\mathrm{Lab}_i$ of the provisional PCS values $\mathrm{Lab}_{pS1}$, the host apparatus 100 executes the solution search process (S210). In the solution search process, the processes in S214 to S224 are repeatedly executed.

First, in S214, the host apparatus 100 converts the provisional PCS values $\mathrm{Lab}_{pS1}$ resulting from a change in the to-be-adjusted PCS values $\mathrm{Lab}_{S1}$, into provisional color values $\mathrm{cmyk}_{pp}$ in accordance with the B2A table 621 of the output profile 620. This is expressed as follows:

$\mathrm{cmyk}_{pp}=f_{icc}(\mathrm{OutputProfile},B2A,\mathrm{Lab}_{pS1})$

In FIG. 2, change values applied to the to-be-adjusted PCS values $\mathrm{Lab}_{S1}$ to adjust the adjustment target T0 is represented as adjustment PCS values $\Delta\mathrm{Lab}$.

$\mathrm{Lab}_{pS1}=\mathrm{Lab}_{S1}+\Delta\mathrm{Lab}$

In the subsequent step S216, based on the cmyk color space (CS2), the host apparatus 100 calculates the square of the Euclid distance D between the provisional color values $\mathrm{cmyk}_{pp}$ and the target color values $\mathrm{cmyk}_T$. Here, for each of the element colors cmyk of the cmyk color space (CS2), the differences between the provisional color values $\mathrm{cmyk}_{pp}$ and the target color values $\mathrm{cmyk}_T$ are represented as Dc, Dm, Dy, or Dk. The Euclid distance D is expressed as follows:

$D=(Dc^2+Dm^2+Dy^2+Dk^2)^{1/2}$

Note that different weights may be applied to the differences Dc, Dm, Dy, and Dk by multiplying at least one of the differences Dc, Dm, Dy, and Dk by a coefficient(s).

In the process in S216, the square of the Euclid distance $D^2=Dc^2+Dm^2+Dy^2+Dk^2$ eliminates the calculation of a square root included in the Euclid distance D, increasing the speed of the solution search process. An objective function $y=f(\mathrm{Lab}_{pS1})$ includes the squares $Dc^2$, $Dm^2$, $Dy^2$, and $Dk^2$ of the differences Dc, Dm, Dy, and Dk between the provisional color values $\mathrm{cmyk}_{pp}$ and the target color values ($\mathrm{cmyk}_T$) for the element colors cmyk. Consequently, the objective function $y=f(\mathrm{Lab}_{pS1})$ includes an element that makes the provisional color values $\mathrm{cmyk}_{pp}$ closer to the adjustment target T0 ($\mathrm{cmyk}_T$), the provisional color values $\mathrm{cmyk}_{pp}$ being acquired by a conversion, in accordance with the B2A table 621, of the provisional PCS values $\mathrm{Lab}_{pS1}$ resulting from a change in the to-be-adjusted PCS values $\mathrm{Lab}_{S1}$.

Note that the solution search process takes much time but, instead of the square $D^2$ of the Euclid distance, the Euclid distance D itself may be included in the objective function $y=f(\mathrm{Lab}_{pS1})$. Furthermore, instead of the square $D^2$ of the Euclid distance, the sum of the absolute value of the difference in c value, the absolute value of the difference in m value, the absolute value of the difference in y value, and the absolute value of the difference in k value, or the like may be used.

In the subsequent step S218, the host apparatus 100 calculates the square of the color difference between the provisional PCS values $\mathrm{Lab}_{pS1}$ and the reference coordinate values $\mathrm{Lab}_{S2}$. As described above, the reference coordinate values $\mathrm{Lab}_{S2}$ are PCS values resulting from a conversion of the target color values $\mathrm{cmyk}_T$ in accordance with the A2B table 622. Here, examples of the color difference include a color difference $\Delta E_{00}$ represented by a CIEDE2000 color difference formula, a color difference $\Delta E^*_{94}$ represented by a CIE1994 color difference formula, a color difference $\Delta E^*_{ab}$ (what is called $\Delta E^*_{76}$) based on a CIE L*a*b* color system proposed in 1976, and a color difference $\Delta E^*_{uv}$ based on a CIE L*u*v* color system. In this specific example, $\Delta E_{00}$ is used as the color difference.

In the process in S218, using the square $\Delta E_{00}^2$ of the color difference eliminates the calculation of a square root included in the color difference $\Delta E_{00}$, increasing the speed of the solution search process. The square $\Delta E_{00}^2$ of the color difference is included in the objective function $y=f(Lab_{pS1})$.

Note that the solution search process takes much time but that, instead of the square $\Delta E_{00}^2$ of the color difference, the color difference $\Delta E_{00}$ itself may be included in the objective function $y=f(Lab_{pS1})$. Furthermore, instead of the color difference $\Delta E_{00}$, the color difference $\Delta E^*_{ab}$, the sum of the absolute value of the difference in L value, the absolute value of the difference in a value, the absolute value of the difference in b value, or the like may be used.

In the subsequent step S220, the host apparatus 100 calculates a cost C based on a constraint condition for the possible ranges of the Lab values (an example of the device independent coordinate values). This is because the provisional PCS values $Lab_{pS1}$ are to fall within the possible ranges of the Lab values. Here, the components (values) of the provisional PCS values $Lab_{pS1}$ are represented by ($L_{pS1}$, $a_{pS1}$, $b_{pS1}$). The cost C can be calculated, e.g., in accordance with the following equations.

For $L_{pS1}<0, C=-L_{pS1}\times Cco$

For $L_{pS1}>100, C=(L_{pS1}-100)\times Cco$

For $a_{pS1}<-128, C=(-128-a_{pS1})\times Cco$

For $a_{pS1}>127, C=(a_{pS1}-127)\times Cco$

For $b_{pS1}<-128, C=(-128-b_{pS1})\times Cco$

For $b_{pS1}>127, C=(b_{pS1}-127)\times Cco$

In the other cases, $C=0$

However, the coefficient Cco may be a positive number and is a sufficiently large number compared to the possible ranges of the Lab values, i.e., approximately $10^3 \leq Cco \leq 10^9$.

When the cost C is included in the objective function $y=f(Lab_{pS1})$, the optimization process is executed such that the possible ranges of the Lab values are applied as a constrain condition for the ranges of the provisional PCS values $Lab_{pS1}$.

Furthermore, the cost C may include an element other than the possible ranges of the device independent coordinate values. For example, in a case where an error results from execution of the processes in S214 to S220 on certain provisional PCS values $Lab_{pS1}$, a value of approximately $10^3$ to $10^9$ may be added to the cost C.

In the subsequent step S222, the host apparatus 100 calculates the objective function $y=f(Lab_{pS1})$ including the square $D^2$ of the Euclid distance, the square $E_{00}^2$ of the color difference, and the cost C. The objective function $y=f(Lab_{pS1})$ is expressed by the following equation, for example.

$$y=D^2+w\times \Delta E_{00}^2+C$$

Here, the coefficient w is a positive number. The B2A table 621 is a color conversion table that converts coordinate values in the three-dimensional Lab color space into coordinate values in the four-dimensional cmyk color space, and thus, an appropriate solution with three variables (a candidate for the optimal solution $Lab_{pb}$) may fail to be found that corresponds to the target color values $cmyk_T$ with four variables. In this regard, the coefficient w may be approximately $1 \leq w \leq 10$.

The above-described processes in S214 to S222 are repeated until a solution (a candidate for the optimal solution $Lab_{pb}$) is found that locally minimizes the objective function $y=f(Lab_{pS1})$ (S224). In a case where the process in S224 is executed first, whether the objective function $y=f(Lab_{pS1})$ has the local minimum value fails to be determined. Thus, the host apparatus 100 changes the provisional PCS values $Lab_{pS1}$ by a slight amount and then returns the process to S214. Subsequently, the host apparatus 100 repeats the processes in S214 to S224 while changing the provisional PCS values $Lab_{pS1}$ by a slight amount. When finding a solution that locally minimizes the objective function $y=f(Lab_{pS1})$, the host apparatus 100 determines the solution to be a candidate for the optimal solution $Lab_{pb}$ and terminates the solution search process in S210.

The host apparatus 100 repeats the processes in S204 to S210 until all the initial values $Lab_i$ of the provisional PCS value $Lab_{pS1}$ are set (S230). Consequently, a candidate for the optimal solution $Lab_{pb}$ is obtained for each initial value $Lab_i$.

In the subsequent step S232, the host apparatus 100 executes a process for determining the optimal solution $Lab_b$, based on a plurality of candidates for the optimal solution $Lab_{pb}$. For example, mapping affects the vicinity of the surface of the color reproduction region, and thus the candidates for the optimal solution resulting from the solution search process may be discrete. Thus, solutions inappropriate as the optimal solution $Lab_b$ are to be removed from the plurality of candidates for the optimal solution $Lab_{pb}$.

FIG. 10 illustrates the optimal-solution determination process executed in S232.

When the optimal-solution determination process is started, the host apparatus 100 extracts, from the plurality of candidates for the optimal solution $Lab_{pb}$, candidates in which a color represented by the PCS values $Lab_{pb}$ is chromatic (S252). Here, in the candidates for the optimal solution $Lab_{pb}$, the a value is represented as $a_{pb}$, and the b value is represented as $b_{pb}$. As illustrated in FIG. 11, the color represented by the candidate for the optimal solution $Lab_{pb}$ may be defined to be chromatic in a case of $|a_{pb}|>Ta$ (Ta>0) or $|b_{pb}|>Tb$ (Tb>0). In this case, the color for which $|a_{pb}|\leq Ta$ and $|b_{pb}|\leq Tb$ are satisfied is achromatic. The thresholds Ta and Tb may be, e.g., approximately $1\leq Ta \leq 5$ and approximately $1\leq Tb \leq 5$. In FIG. 11, coordinates Z0 are the coordinates of the reference coordinate values $Lab_{S2}$, and coordinates Z1 are the coordinates of an achromatic candidate for the optimal solution. Coordinates Z2, Z3, and Z4 of candidates for the optimal solution are coordinates for chromatic, and thus, the candidates for the optimal solution with the coordinates Z2, Z3, and Z4 are extracted.

In the subsequent step S254, the host apparatus 100 excludes, from the chromatic candidates for the optimal solution $Lab_{pb}$, candidates for the optimal solution belonging to quadrants of the hue plane (a-b plane) different from a quadrant to which the reference coordinate values $Lab_{S2}$ belong. In FIG. 11, the coordinates Z0 of the reference coordinate values $Lab_{S2}$ lie in a first quadrant. The coordinates Z2 of a candidate for the optimal solution lie in the first quadrant, and thus, the candidate for the optimal solution with the coordinates Z2 remains instead of being excluded. The coordinates Z3 of a candidate for the optimal solution lie in a second quadrant, and the coordinates Z4 of a candidate for the optimal solution lie in a fourth quadrant. Thus, the candidates for the optimal solution with the coordinates Z3 and Z4 are excluded.

In the subsequent step S256, the host apparatus 100 branches the process depending on whether any candidate for the optimal solution $Lab_{pb}$ remains. A determination criterion for S256 is included in prescribed determination criteria for determining whether a candidate for the optimal solution $Lab_{pb}$ is suitable for acquiring the optimal solution $Lab_b$. In a case where the plurality of candidates for the optimal solution $Lab_{pb}$ resulting from the solution search process in S210 include an achromatic candidate for the optimal solution (e.g., the candidate for the optimal solution with the coordinates Z1) or a chromatic candidate for the optimal solution (e.g., the candidate for the optimal solution with the coordinates Z2) belonging to the same quadrant to which the reference coordinate values $Lab_{S2}$ belong, the process proceeds to S258.

In the above-described step S258, the host apparatus 100 excludes, from the remaining candidates for the optimal solution $Lab_{pb}$, candidates lying outside the color reproduction region of the input profile 610. This is because, for the to-be-adjusted input profile 610, the color reproduction region dependent on the target color printing machine 300 needs to be taken into account. Whether the coordinates of the candidate for the optimal solution $Lab_{pb}$ lie inside or outside the color reproduction region of the input profile 610 may be determined by, for example, converting the PCS values $Lab_{pb}$ into CMYK values (denoted by $CMYK_{pb}$) in accordance with the B2A table of the input profile 610, then converting the CMYK values $CMYK_{pb}$ into PCS values (denoted by $Lab_{Spb}$) in accordance with the A2B table 611 of the input profile 610, and determining whether the color difference (e.g., $\Delta E_{00}$) between the resultant PCS values $Lab_{Spb}$ and the original PCS values $Lab_{pb}$ exceeds a threshold (denoted as Eth). The threshold Eth is a positive number and is not particularly limited. However, the threshold Eth may be set, for example, to from approximately 1.0 to 3.0. For example, the coordinates may be determined to lie outside the color reproduction region in a case of $\Delta E_{00}$>Eth and to lie inside the color reproduction region in a case of $\Delta E_{00} \leq Eth$. Note that, in a case where the Lab values $Lab_{pb}$ lie outside the color reproduction region of the target printing machine 300, a conversion from the Lab values $Lab_{pb}$ into the CMYK values $CMYK_{pb}$ is compressed into the color reproduction region of the target printing machine 300. Thus, a comparison of the color difference between the PCS values $Lab_{Spb}$ and the $Lab_{pb}$ with the threshold Eth allows determination of whether the coordinates lie inside or outside the color reproduction region.

Of course, the determination of whether the coordinates lie inside or outside the color reproduction region is not limited to the above-described method but may be, for example, a method disclosed in JP-A-7-254995. For example, paragraphs 0150 to 0171 in this publication disclose that whether coordinates lie inside or outside a color reproduction region of a printer is determined by expressing the color reproduction region in an a-b plane (a plane determined by an a axis and a b axis that are orthogonal to each other) according to a lightness L and determining whether target data is included in a closed region in the a-b plane at a target lightness.

In the subsequent step S260, the host apparatus 100 branches the process depending on whether any candidate for the optimal solution $Lab_{pb}$ remains. A determination criterion for S260 is included in prescribed determination criteria for determining whether a candidate for the optimal solution $Lab_{pb}$ is suitable for acquiring the optimal solution $Lab_b$. In a case where the candidates for the optimal solution $Lab_{pb}$ remaining from the determination process in S256 include the candidate for the optimal solution in the color reproduction region of the input profile 610, the process proceeds to S262.

In the above-described step S262, the host apparatus 100 determines, as the optimal solution $Lab_b$, the candidate for the optimal solution $Lab_{pb}$ that minimizes the value of the objective function $y = D^2 + w \times \Delta E_{00}^2 + C$ calculated in the solution search process in S210, and terminates the optimal-solution determination process.

The resultant solution $Lab_b$ is the optimal solution that makes the provisional color values $cmyk_{pp}$ be as close as possible to the target color values $cmyk_T = cmyk_p + \Delta cmyk_{T-p}$. When the optimal solution $Lab_b$ is acquired, the optimal solution $Lab_b$ is inhibited from deviating significantly from the reference coordinate values $Lab_{S2}$ predicted to be close to the target color values, restricting the provisional PCS values $Lab_{pS1}$ to within the possible range of the Lab values. When such optimal solution $Lab_b$ is used to adjust the input profile 610, color reproduction accuracy can be improved.

As described above, the B2A table 621 is a color conversion table with a three-dimensional input and a four-dimensional output, and thus, an appropriate candidate for the optimal solution $cmyk_{pb}$ with three variables may fail to remain that corresponds to the target color values $cmyk_T$ with four variables. In the above-described steps S256 and S260, in a case where no candidate for the optimal solution $Lab_{pb}$ remains, the host apparatus 100 determines the reference coordinate values $Lab_{S2}$ to be the optimal solution $Lab_b$(S264), and terminates the optimal-solution determination process.

Note that, in the optimal-solution determination process, instead of the process in S254, a process may be executed to exclude candidates for the optimal solution $Lab_{pb}$ involving a hue angle to the reference coordinate values $Lab_{S2}$ exceeding a threshold.

Furthermore, the processes in S258 to S260 may be eliminated, and candidates for the optimal solution $Lab_{pb}$ lying outside the color reproduction region of the input profile 610 may be left.

Figure 12:
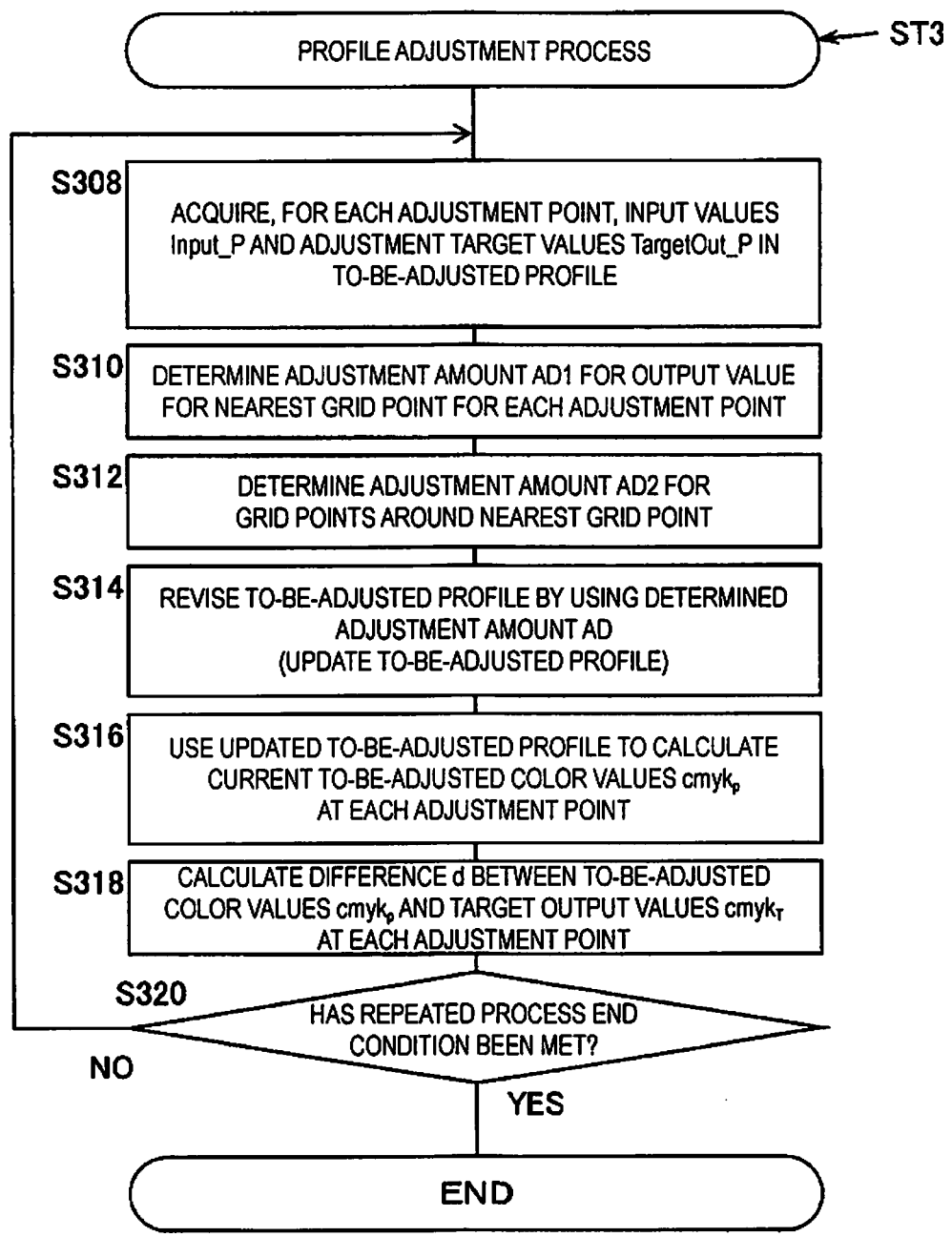
FIG. 12 is a flowchart illustrating an example of a profile adjustment process.

After the process in S232 in FIG. 8, the host apparatus 100 executes the profile adjustment process illustrated in FIG. 12. The profile adjustment process corresponds to the profile adjustment step ST3, the profile adjustment function FU3, and the profile adjustment unit U3. Here, in a case where "Perceptual" is specified in the intent specification section 860, the host apparatus 100 uses, in a process in S308 and the subsequent steps, information in the profile 500 indicated by the A2B0 tag and the B2A0 tag as illustrated in FIG. 4. In a case where "Relative Colorimetric" is specified in the intent specification section 860, the host apparatus 100 uses, in the process in S308 and the subsequent steps, information in the profile 500 indicated by the A2B1 tag and the B2A1 tag as illustrated in FIG. 4. In a case where "Saturation" is specified in the intent specification section 860, the host apparatus 100 uses, in the process in S308 and the subsequent steps, information in the profile 500 indicated by the A2B2 tag and the B2A2 tag as illustrated in FIG. 4.

First, the host apparatus 100 acquires, for each adjustment point P0, input values Input_P and adjustment target values TargetOut_P in the to-be-adjusted input profile 610 (S308). This is to adjust the correspondence relationship between the input values and the output values in the to-be-adjusted input profile 610. This is expressed by the following equations.

$$Input\_P = CMYK_{in}$$

$$TargetOut\_P = Lab_b$$

Furthermore, the current output values CurrentOut_P in the input profile 610 is the to-be-adjusted PCS values $Lab_{S1}$, which are the current output values in the input profile 610.

$$CurrentOut\_P = Lab_{S1}$$

In terms of the PCS CS3, the relative value of the adjustment target T0 is represented by TargetOut_P−CurrentOut_P.

After acquisition of the input values Input_P and the adjustment target values TargetOut_P, the host apparatus 100 adjusts, in S310 to S312, the adjustment range A0 of the to-be-adjusted input profile 610, based on the adjustment target T0.

First, with reference to FIG. 14A and FIG. 14B, a concept in which the input profile 610 is adjusted in the adjustment range A0 will be described. Here, in FIG. 14A and FIG. 14B, the horizontal axis indicates an input value along a certain coordinate axis of the input color space CS4, and the vertical axis indicates an output value along a certain coordinate axis of the output color space CS5. In a case where the input color space CS4 is the CMYK color space, the horizontal axis corresponds to the C axis, the M axis, the Y axis, or the K axis. In a case where the output color space CS5 is the Lab color space, the vertical axis corresponds to the L axis, the a axis, or the b axis. White circles on the horizontal axis indicate grid points GD0.

Figure 14A:
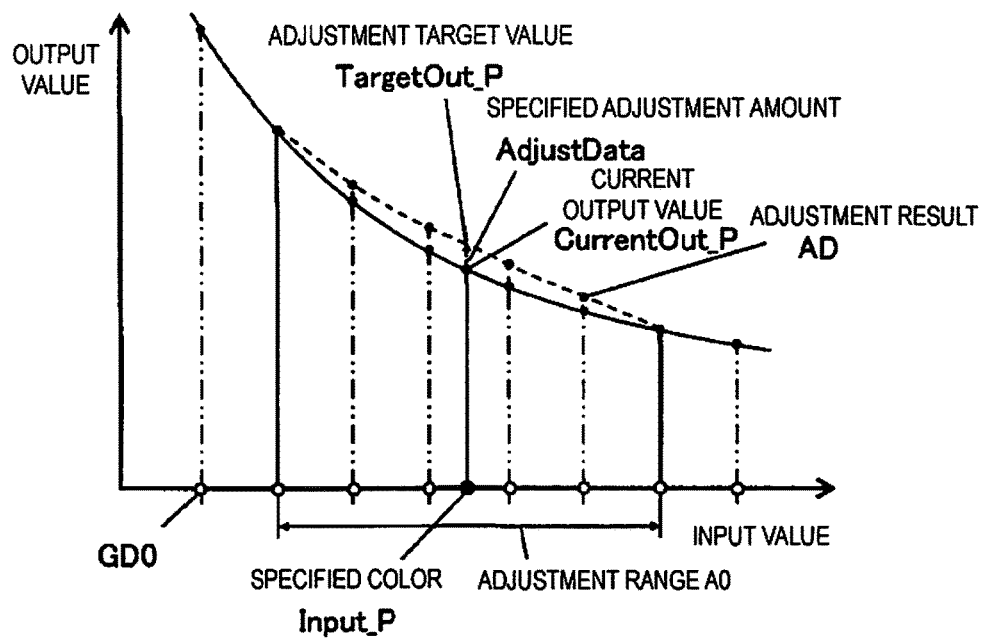
FIG. 14A is a diagram schematically illustrating an adjustment amount for each grid point in a case where a to-be-adjusted profile is adjusted in an output color space for the profile.

FIG. 14A schematically illustrates an adjustment amount AD for each grid point GD0 in a case where the output value is adjusted. The adjustment point P0 specified by the user corresponds to the input value Input_P. When the user gives an instruction for the adjustment amount AdjustData as the adjustment target T0, the adjustment amount AdjustData is added to the current output value CurrentOut_P corresponding to the input value Input_P to set the adjustment target TargetOut_P.

An input to the adjustment range specification section 850 or the target acceptance area 840 illustrated in FIG. 7 sets the adjustment range A0 for the adjustment amount AdjustData. Basically, the adjustment amount for the output value is maximized with respect to the input value Input_P, and the adjustment amount is set to 0 at boundaries of the adjustment range A0. However, actual adjustment is performed on the grid points GD0 in the input profile 610, and thus, the adjustment may affect a range wider than the set adjustment range A0.

Figure 14B:
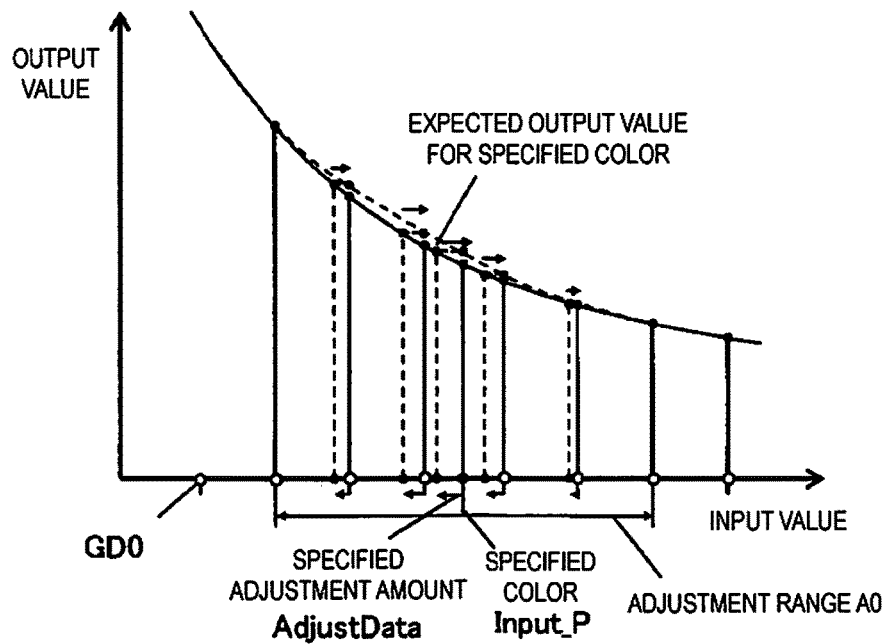
FIG. 14B is a diagram schematically illustrating the adjustment amount for each grid point in a case where the to-be-adjusted profile is adjusted in an input color space for the profile.

FIG. 14B schematically illustrates the adjustment amount AD for each grid point GD0 in a case where the input value is adjusted. The adjustment point P0 specified by the user corresponds to the input value Input_P. When the user gives an instruction for the adjustment amount AdjustData as the adjustment target T0, the adjustment amount AdjustData is added to the input value Input_P to determine an output value corresponding to the input value Input_P+AdjustData. The output value is an output value expected at the adjustment point P0 specified by the user.

The above-described correction is performed for all the coordinate axes in the CMYK color space (CS1) and for all the coordinate values in the PCS CS3.

Now, with reference to FIG. 15A and FIG. 15B, an example will be described where the adjustment amount AD is set for each grid point GD0 within the adjustment range A0. Here, in FIG. 15A and FIG. 15B, the horizontal axis indicates an input value that is any of CMYK values, and the vertical axis indicates the adjustment amount AD for an output value that is any of cmyk values. Furthermore, triangular marks on the horizontal axis indicate the grid points within the adjustment range A0 (excluding a nearest grid point GDnearest), and square marks on the horizontal axis indicate grid points outside the adjustment range A0 for which the output value is not to be modified.

Figure 15A:
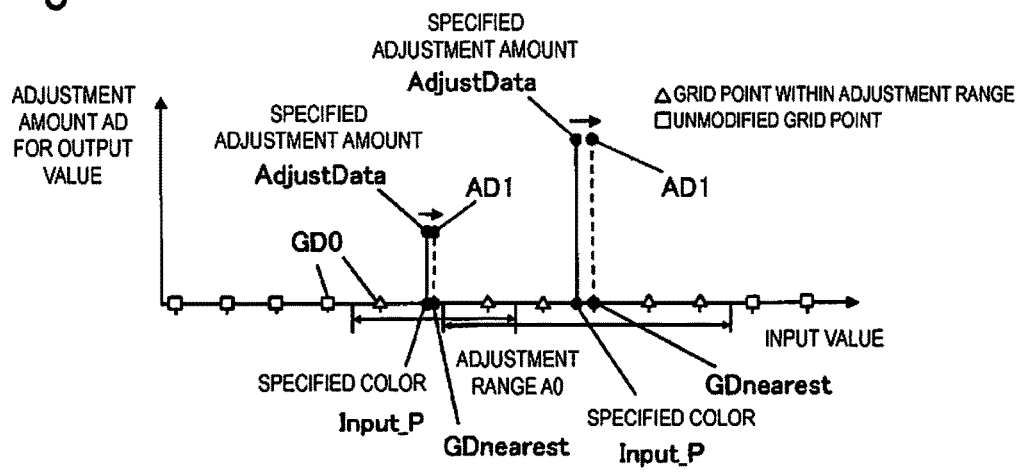
FIG. 15A is a diagram schematically illustrating an example where the adjustment amount for an output value for the nearest grid point is determined.

First, as illustrated in FIG. 15A, the host apparatus 100 determines, for each adjustment point P0, an adjustment amount AD1 for the output value for the nearest grid point GDnearest, which is closest to the adjustment point P0 (S310 in FIG. 12). FIG. 15A illustrates an example where the adjustment amount AD1 for the output value is determined in a case where two adjustment points P0 (input values Input_P) are specified on a certain coordinate axis of the input color space CS4, which is the CMYK color space (CS1). In the example in FIG. 15A, the adjustment amount AdjustData for each input value Input_P is used as the adjustment amount AD1 for the output value for the nearest grid point GDnearest without any change. Of course, the technique is not limited to setting, to the adjustment amount AdjustData, the adjustment amount AD1 for the output value for the nearest grid point GDnearest.

Note that a plurality of adjustment points lying near one another may have the same nearest grid point GDnearest. In this case, for example, in the input color space CS4, the adjustment amounts AdjustData for the adjustment points may be averaged at a rate inversely proportional to a distance from the nearest grid point GDnearest to the adjustment point.

Figure 15B:
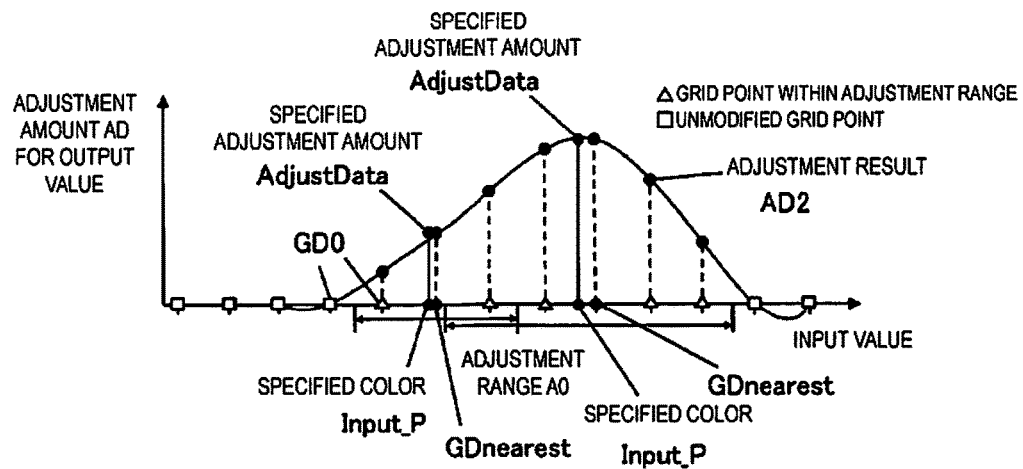
FIG. 15B is a diagram schematically illustrating an example where the adjustment amounts for output values for grid points around the nearest grid point are determined.

After determination of the adjustment amount AD1 for the output value for the nearest grid point GDnearest, the host apparatus 100 determines an adjustment amount AD2 for the output value for the grid points (the grid points with the triangular marks) lying within the adjustment range A0 and around the nearest grid point GDnearest (S312 in FIG. 12), as illustrated in FIG. 15B. For example, with the adjustment amount for the output value for the grid points outside the adjustment range A0 set to 0 and with the adjustment amount AD1 for the output value for each nearest grid point GDnearest described above set to AdjustData, an interpolation calculation is executed using a four-dimensional cubic spline function. Then, the adjustment amount AD2 for the output value for the grid points around the nearest grid point GDnearest can be determined. Such an interpolation calculation smoothly connects the adjustment amount AD2 for the output value for the grid points around the nearest grid point GDnearest to the adjustment amount AD1 for the output value for each nearest grid point GDnearest and to the adjustment amount "0" for the output value for the grid points outside the adjustment range A0.

Of course, the technique is not limited to the use of the spline function for the interpolation calculation.

Note that, since the adjustment amount AD is intended for the grid points, in a case where a plurality of adjustment points lie near one another, the same grid point may be referenced when input colors for the adjustment points are color-converted in accordance with the input profile 610. For such a grid point, the adjustment amounts AdjustData for the adjustment points are averaged for adjustment.

After the determination of the adjustment amount AD for the output value for each grid point within the adjustment range A0, the host apparatus 100 revises the to-be-adjusted input profile 610 by using the determined adjustment amount AD (S314 in FIG. 12). That is, for each grid point within the adjustment range A0, a value obtained by adding the adjustment amount AD to the current output value may be written to the input profile 610 as an updated output value. The output color space CS5 in the input profile 610 is the Lab color space, and thus, the updated output values are values ($Lq+\Delta Lq$, $aq+\Delta aq$, $bq+\Delta bq$) resulting from the sum of the current output values (denoted by Lq, aq, bq) and the adjustment amounts (denoted by ΔLq, Δaq, Δbq). In this case, the variable q is a variable that identifies each grid point within the adjustment range A0.

As described above, the correspondence relationship for the input profile 610 is adjusted to make the current to-be-adjusted color values $cmyk_p$ closer to the target color values $cmyk_T$ in the second color space SC2. In a case where information corresponding to the specification intent is included in the input profile 610, the input profile 610 is adjusted for a correspondence relationship corresponding to the specification intent.

After the update of the input profile 610, for each adjustment point P0 input to the target acceptance area 840, the host apparatus 100 uses the updated input profile 610 to obtain the current to-be-adjusted color values $cmyk_p$ (S316). The updated to-be-adjusted color values $cmyk_p$ may be calculated using the same equation used for the process in S120 in FIG. 6. In a case where information corresponding to the specification intent is included in the profile, a color conversion is performed in accordance with the information corresponding to the specification intent.

Furthermore, the host apparatus 100 obtains, for each adjustment point P0 input to the target acceptance area 840, the difference d between the updated to-be-adjusted color values $cmyk_p$ and the target output values $cmyk_T$ (S318). The difference may be, for example, a Euclid distance between a point corresponding to the to-be-adjusted color values $cmyk_p$ and a point corresponding to the target output values $cmyk_T$ in the cmyk color space (CS2).

Then, the host apparatus 100 determines whether an end condition for the repeated processes in S308 to S320 has been met (S320), and in a case where the end condition has not been met, repeats the processes in S308 to S320. In a case where the end condition has been met, the host apparatus 100 causes the storage device 114 to store the adjusted input profile 610, and ends the profile adjustment process. For example, the end condition is met in a case where the difference d is smaller than or equal to a prescribed threshold for all the adjustment points P0. Alternatively, the end condition may be met in a case where a specified number of repetitions have been performed.

As described above, the optimization process using the B2A table 621 of the output profile 620 is executed to obtain the optimal solution $Lab_b$ that makes the output values be as close as possible to the target color values $cmyk_T$, thus adjusting the input profile 610 (at least the A2B table 611). The optimal solution $Lab_b$ includes no error from the A2B table 622 of the output profile 620, and thus, when a color conversion is performed in accordance with the adjusted input profile 610 and the output profile 620, the output colors from the printer 200 is close to the intended colors. Therefore, this specific example can improve the color reproduction accuracy of the profile representing the correspondence relationship between the coordinate values in the device dependent color space and the PCS coordinate values.

Furthermore, the device link table 631 of the device link profile 630 may be created by merging the A2B table 611 of the adjusted input profile 610 and the B2A table 621 of the output profile 620. Therefore, this specific example can also improve the color reproduction accuracy of the device link profile.

6. MODIFIED EXAMPLES

Within the scope of the invention, various modified examples are conceivable.

For example, the output device is not limited to the ink jet-type printer but may be an electrophotographic printer such as a laser printer which uses toner as a color material, a three-dimensional printer, a display apparatus, or the like.

The types of color materials forming images are not limited to C, M, Y, and K but may include not only C, M, Y, and K but also dark yellow (DY), orange (Or), and green (Gr) that are higher in density than Lc, Lm, and Y, light black (Lk) that is lower in density than K, a non-tinted color material for image quality improvement, and the like.

Of course, the second color space is not limited to the cmyk color space but may be a CMY color space, an RGB color space, or the like.

The target device is not limited to the target printing machine but may be a display apparatus or the like.

Of course, the first color space is not limited to the CMYK color space but may be a CMY color space, an RGB color space, or the like.

The above-described processes may be properly changed, e.g., reordered. For example, in the optimization process in FIG. 8, the process for calculating the square $D^2$ of the Euclid distance in S216 can be executed after either of the processes in S218 and S220. Furthermore, in the optimal-solution determination processes in FIG. 10, the processes in S252 to S256 may be executed after the processes in S258 to S260.

Furthermore, the process for calculating the cost C in S220 may be omitted, and in the calculation process in S222, the objective function $y = D^2 + w \times \Delta E_{00}^2$ may be calculated. Also in this case, in a case where, in the optimal-solution determination process in S232, the optimal solution $Lab_b$ is determined to be a candidate for the optimal solution $Lab_{pb}$ that is included in the candidates resulting from a plurality of the initial values $Lab_i$ and that minimizes the value of the objective function y, then the color reproduction accuracy of the input profile 610 is improved.

Furthermore, the process for calculating the square $\Delta E_{00}^2$ of the color difference in S218 may be omitted, and in the calculation process in S222, the objective function $y = D^2$ or $y = D^2 + C$ may be calculated. Also in this case, in a case where, in the optimal-solution determination process in S232, the optimal solution $Lab_b$ is determined to be the candidate for the optimal solution $Lab_{pb}$ that is included in the candidates resulting from a plurality of the initial values $Lab_i$ and that minimizes the value of the objective function y, then the color reproduction accuracy of the input profile 610 is improved.

Moreover, even when the provisional PCS values $Lab_{pS1}$ have a single initial value $Lab_i$ such as the reference coordinate values Lab, the optimal solution $Lab_b$ for the PCS values is acquired that makes the cmyk values be as close as possible to the target color value $cmyk_T$. When the optimal solution $Lab_b$ is used to adjust the input profile 610, the color reproduction accuracy of the input profile 610 can be improved.

7. CONCLUSION

As described above, the aspects of the invention can provide, e.g., a technique capable of improving the color reproduction accuracy of the profile representing the correspondence relationship between the coordinate values in the device dependent color space and the coordinate values in the profile connection space. Of course, even a technique including only the components recited in the independent claims produces the above-described basic advantages.

Furthermore, the aspects of the invention can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the invention include these configurations and the like.

This application claims priority under 35 U.S.C. § 119 to Japanese Patent Application No. 2017-211807, filed Nov. 1, 2017. The entire disclosure of Japanese Patent Application No. 2017-211807 is hereby incorporated herein by reference.

What is claimed is:

1. A profile adjustment method for causing a computer to execute a process for adjusting a to-be-adjusted profile representing a correspondence relationship between first coordinate values in a first device dependent color space and device independent coordinate values in a profile connection space, the profile adjustment method comprising:
   acquiring, for an adjustment point corresponding to a to-be-adjusted color, an adjustment target based on coordinates in a second device dependent color space;
   performing optimization including, defining, as a first conversion table, a color conversion table used to convert the device independent coordinate values into second coordinate values in the second device dependent color space, in an output profile representing a correspondence relationship between the device independent coordinate values and the second coordinate values, defining the device independent coordinate value at the adjustment point as to-be-adjusted PCS values, and executing an optimization process including an element making provisional color values closer to the adjustment target, the provisional color value being acquired by a conversion, in accordance with the first conversion table, of provisional PCS values resulting from a change in the to-be-adjusted PCS values, thus acquiring an optimal solution for the device independent coordinate values corresponding to the adjustment target; and
   adjusting the to-be-adjusted profile, based on the optimal solution for the device independent coordinate values.

2. The profile adjustment method according to claim 1, wherein
   the second coordinate values representing the adjustment target are defined as target color values, and
   during the performing optimization, an objective function including a square of a difference between the provisional color values and the target color values is used to acquire the optimal solution through the optimization process for each element color of the second device dependent color space.

3. The profile adjustment method according to claim 1, wherein
   the second coordinate values representing the adjustment target are defined as target color values, and a color conversion table used to convert the second coordinate values into the device independent coordinate values in the output profile is defined as a second conversion table, and
   during the performing optimization, the optimal solution is acquired through the optimization process using an objective function including a difference between the provisional color values and the target color values for each element color in the second device dependent color space, the objective function including, besides the difference, a color difference between the provisional PCS values and the device independent coordinate values resulting from a conversion of the target color value in accordance with the second conversion table.

4. The profile adjustment method according to claim 1, wherein
   during the performing optimization, with a possible range of the device independent coordinate values applied as a constraint condition for ranges of the provisional PCS values, the optimal solution is acquired through the optimization process.

5. The profile adjustment method according to claim 1, wherein
   the second coordinate values representing the adjustment target is defined as target color values, and a color conversion table used to convert the second coordinate values into the device independent coordinate values in the output profile is defined as a second conversion table, and
   during the performing optimization, the device independent coordinate values resulting from a conversion of the target color values in accordance with the second conversion table are used for the optimization process as initial values of the provisional PCS values.

6. The profile adjustment method according to claim 1, wherein
   during the performing optimization, a plurality of initial values are used for the provisional PCS values in the optimization process, the optimization process using an objective function is executed on each of the plurality of initial values to acquire a plurality of candidates for the optimal solution for the device independent coordinate values, and the optimal solution is acquired based on the plurality of candidates for the optimal solution.

7. The profile adjustment method according to claim 6, wherein
   the second coordinate values representing the adjustment target are defined as target color values, a color conversion table used to convert the second coordinate values into the device independent coordinate values in the output profile is defined as a second conversion table, and the device independent coordinate values resulting from a conversion of the target color values in accordance with the second conversion table is defined as reference coordinate values, and
   during the performing optimization, when colors represented by the candidates for the optimal solution are determined to be chromatic, the optimal solution is acquired based on the candidates for the optimal solution belonging to the same quadrant of a hue plane in the profile connection space to which the reference coordinate value belongs.

8. The profile adjustment method according to claim 6, wherein
   the second coordinate values representing the adjustment target are defined as target color values, a color conversion table used to convert the second coordinate values into the device independent coordinate values in the output profile is defined as a second conversion table, and the device independent coordinate values resulting from a conversion of the target color values in accordance with the second conversion table are defined as reference coordinate values, and during the performing optimization, whether the candidates for the optimal solution are suitable for acquiring the optimal solution is determined in accordance with a prescribed determination criterion, and when the plurality of candidates for the optimal solution are determined to be not suitable for acquiring the optimal solution, the optimal solution is determined to be the reference coordinate values.

9. The profile adjustment method according to claim 2, wherein the second coordinate values representing the adjustment target are defined as target color values, and a color conversion table used to convert the second coordinate values into the device independent coordinate values in the output profile is defined as a second conversion table, and during the performing optimization, the optimal solution is acquired through the optimization process using an objective function including a difference between the provisional color values and the target color values for each element color in the second device dependent color space, the objective function including, besides the difference, a color difference between the provisional PCS values and the device independent coordinate values resulting from a conversion of the target color values in accordance with the second conversion table.

10. The profile adjustment method according to claim 2, wherein during the performing optimization, with a possible range of the device independent coordinate values applied as a constraint condition for a range of the provisional PCS values, the optimal solution is acquired through the optimization process.

11. The profile adjustment method according to claim 3, wherein during the performing optimization, with a possible range of the device independent coordinate values applied as a constraint condition for a range of the provisional PCS values, the optimal solution is acquired through the optimization process.

12. The profile adjustment method according to claim 2, wherein the second coordinate values representing the adjustment target are defined as target color values, and a color conversion table used to convert the second coordinate values into the device independent coordinate values in the output profile is defined as a second conversion table, and during the performing optimization, the device independent coordinate values resulting from a conversion of the target color values in accordance with the second conversion table are used for the optimization process as initial values of the provisional PCS values.

13. The profile adjustment method according to claim 3, wherein the second coordinate values representing the adjustment target are defined as target color values, and a color conversion table used to convert the second coordinate values into the device independent coordinate values in the output profile is defined as a second conversion table, and during the performing optimization, the device independent coordinate values resulting from conversion of the target color values in accordance with the second conversion table are used for the optimization process as initial values of the provisional PCS values.

14. The profile adjustment method according to claim 4, wherein the second coordinate values representing the adjustment target are defined as target color values, and a color conversion table used to convert the second coordinate values into the device independent coordinate values in the output profile is defined as a second conversion table, and during the performing optimization, the device independent coordinate values resulting from a conversion of the target color values in accordance with the second conversion table are used for the optimization process as initial values of the provisional PCS values.

15. The profile adjustment method according to claim 2, wherein during the performing optimization, a plurality of initial values are used for the provisional PCS values in the optimization process, the optimization process using an objective function is executed on each of the plurality of initial values to acquire a plurality of candidates for the optimal solution for the device independent coordinate values, and the optimal solution is acquired based on the plurality of candidates for the optimal solution.

16. The profile adjustment method according to claim 3, wherein during the performing optimization, a plurality of initial values are used for the provisional PCS values in the optimization process, the optimization process using an objective function is executed on each of the plurality of initial values to acquire a plurality of candidates for the optimal solution for the device independent coordinate values, and the optimal solution is acquired based on the plurality of candidates for the optimal solution.

17. The profile adjustment method according to claim 4, wherein during the performing optimization, a plurality of initial values are used for the provisional PCS values in the optimization process, the optimization process using an objective function is executed on each of the plurality of initial values to acquire a plurality of candidates for the optimal solution for the device independent coordinate values, and the optimal solution is acquired based on the plurality of candidates for the optimal solution.

18. The profile adjustment method according to claim 7, wherein the second coordinate values representing the adjustment target are defined as target color values, a color conversion table used to convert the second coordinate values into the device independent coordinate values in the output profile is defined as a second conversion table, and the device independent coordinate values resulting from a conversion of the target color values in accordance with the second conversion table are defined as reference coordinate values, and during the performing optimization, whether the candidates for the optimal solution are suitable for acquiring the optimal solution is determined in accordance with a prescribed determination criterion, and when the plurality of candidates for the optimal solution are determined to be not suitable for acquiring the optimal solution, the optimal solution is determined to be the reference coordinate values.

19. A non-transitory computer-readable medium storing a profile adjustment program for adjusting a to-be-adjusted profile representing a correspondence relationship between first coordinate values in a first device dependent color space and device independent coordinate values in a profile connection space, the program causing the computer to implement:

a target acquisition function to acquire, for an adjustment point corresponding to a to-be-adjusted color, an adjustment target based on coordinates in a second device dependent color space;

an optimization function to define, as a first conversion table, a color conversion table used to convert the device independent coordinate values into second coordinate values in the second device dependent color space, in an output profile representing a correspondence relationship between the device independent coordinate values and the second coordinate values, to define the device independent coordinate value at the adjustment point as to-be-adjusted PCS values, and to execute an optimization process including an element making provisional color values closer to the adjustment target, the provisional color value being acquired by a conversion, in accordance with the first conversion table, of provisional PCS values resulting from a change in the to-be-adjusted PCS values, thus acquiring an optimal solution for the device independent coordinate values corresponding to the adjustment target; and a profile adjustment function to adjust the to-be-adjusted profile, based on the optimal solution for the device independent coordinate values.

20. A profile adjustment apparatus adjusting a to-be-adjusted profile representing a correspondence relationship between first coordinate values in a first device dependent color space and device independent coordinate values in a profile connection space, the profile adjustment apparatus comprising:

a target acquisition unit configured to acquire, for an adjustment point corresponding to a to-be-adjusted color, an adjustment target based on coordinates in a second device dependent color space;

an optimization unit configured to define, as a first conversion table, a color conversion table used to convert the device independent coordinate values into second coordinate values in the second device dependent color space, in an output profile representing a correspondence relationship between the device independent coordinate values and the second coordinate values, to define the device independent coordinate value at the adjustment point as to-be-adjusted PCS values, and to execute an optimization process including an element making provisional color values closer to the adjustment target, the provisional color value being acquired by a conversion, in accordance with the first conversion table, of provisional PCS values resulting from a change in the to-be-adjusted PCS values, thus acquiring an optimal solution for the device independent coordinate values corresponding to the adjustment target; and a profile adjustment unit configured to adjust the to-be-adjusted profile based on the optimal solution for the device independent coordinate values.

* * * * *